United States Patent
Wang

(10) Patent No.: US 11,432,357 B2
(45) Date of Patent: Aug. 30, 2022

(54) MULTIPATH ESTABLISHMENT METHOD AND APPARATUS

(71) Applicant: HUAWEI TECHNOLOGIES CO., LTD., Shenzhen (CN)

(72) Inventor: Shujun Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 95 days.

(21) Appl. No.: 16/983,708

(22) Filed: Aug. 3, 2020

(65) Prior Publication Data

US 2020/0367306 A1    Nov. 19, 2020

Related U.S. Application Data

(63) Continuation of application No. PCT/CN2019/071509, filed on Jan. 13, 2019.

(30) Foreign Application Priority Data

Feb. 6, 2018   (CN) .......................... 201810119602.7

(51) Int. Cl.
*H04W 76/16* (2018.01)
*H04L 9/40* (2022.01)
(Continued)

(52) U.S. Cl.
CPC ......... *H04W 76/16* (2018.02); *H04L 63/0876* (2013.01); *H04W 12/06* (2013.01); *H04W 80/06* (2013.01); *H04W 88/182* (2013.01)

(58) Field of Classification Search
None
See application file for complete search history.

(56) References Cited

U.S. PATENT DOCUMENTS

| 10,430,607 B2 * | 10/2019 | Mumford ............ G06F 21/6236 |
| 2013/0021998 A1 | 1/2013 | Shatsky |

(Continued)

FOREIGN PATENT DOCUMENTS

| CN | 101360110 A | 2/2009 |
| CN | 102892111 A | 1/2013 |

(Continued)

OTHER PUBLICATIONS

WBA Community Wi Fi White Paper 1.0, dated Sep. 12, 2014, total 100 pages.

(Continued)

*Primary Examiner* — Rebecca E Song
(74) *Attorney, Agent, or Firm* — Stein IP, LLC

(57) ABSTRACT

A multipath establishment method and apparatus which relate to the field of communications technologies. The method includes: performing identity authentication on a terminal that accesses a first network via a first network access device, where the first network implements communication by using a base station; performing an admission check on the terminal that accesses a second network via a second network access device; and after both the identity authentication and the admission check of the terminal succeed, establishing a first path between the terminal and a service server via the first network, and establishing a second path between the terminal and the service server via the second network, where the first path and the second path are used to perform data transmission between the terminal and the service server.

20 Claims, 14 Drawing Sheets

(51) Int. Cl.
*H04W 12/06* (2021.01)
*H04W 80/06* (2009.01)
*H04W 88/18* (2009.01)

(56) References Cited

U.S. PATENT DOCUMENTS

| | | | |
|---|---|---|---|
| 2013/0185354 A1* | 7/2013 | Seligstein | A63F 13/655 |
| | | | 709/204 |
| 2015/0040221 A1* | 2/2015 | Mishra | H04L 63/1441 |
| | | | 726/22 |
| 2015/0312383 A1* | 10/2015 | Roeland | H04L 69/14 |
| | | | 370/331 |
| 2017/0105239 A1 | 4/2017 | Mohebbi | |
| 2017/0118787 A1* | 4/2017 | Kekki | H04W 76/15 |
| 2018/0184474 A1* | 6/2018 | Skog | H04L 67/14 |

FOREIGN PATENT DOCUMENTS

| | | | | |
|---|---|---|---|---|
| CN | 104092698 A | 10/2014 | | |
| CN | 104854837 A | 8/2015 | | |
| CN | 105578463 A | 5/2016 | | |
| JP | 2009516937 A | 4/2009 | | |
| JP | 2010028577 A | 2/2010 | | |
| JP | 2015015581 A | 1/2015 | | |
| JP | 2016508308 A | 3/2016 | | |
| JP | 2017537501 A | 12/2017 | | |
| JP | 2018501694 A | 1/2018 | | |
| KR | 20140037230 A | 3/2014 | | |
| WO | WO-2013171603 A1 * | 11/2013 | | H04W 12/068 |
| WO | 2014090335 A1 | 6/2014 | | |
| WO | WO-2015199340 A1 * | 12/2015 | | H04L 29/08 |
| WO | WO-2016007050 A1 * | 1/2016 | | H04L 69/14 |
| WO | 2016112860 A1 | 7/2016 | | |
| WO | 2016144224 A1 | 9/2016 | | |
| WO | WO-2018004114 A2 * | 1/2018 | | H04L 29/06 |

OTHER PUBLICATIONS

RFC6824 A. Ford et al.,"TCP Extensions for Multipath Operation with Multiple Addresses",Internet Engineering Task Force (IETF),dated Jan. 2013,total 64 pages.

* cited by examiner

MULTIPATH ESTABLISHMENT METHOD AND APPARATUS

CROSS-REFERENCE TO RELATED APPLICATIONS

This application is a continuation of International Application No. PCT/CN2019/071509, filed on Jan. 13, 2019, which claims priority to Chinese Patent Application No. 201810119602.7, filed on Feb. 6, 2018, The disclosures of the aforementioned applications are hereby incorporated by reference in their entireties.

TECHNICAL FIELD

Aspects of this application relate to the field of communications technologies, and in particular, to a multipath establishment method and apparatus.

BACKGROUND

With rapid development of communications technologies, an amount of network information is increasingly large, and a terminal can support more communication modes. For example, the terminal usually can support both wireless fidelity (Wi-Fi) communication and 3rd generation partnership project (3GPP) communication. However, single-path transmission is used in a conventional transmission control protocol (TCP). Consequently, a plurality of communication modes supported by the terminal cannot simultaneously serve a same service, causing a waste of resources. Therefore, a multipath transmission control protocol (MPTCP) emerges, and the MPTCP provides a plurality of paths to maximize resource utilization.

Currently, the terminal implements multipath access by using an MPTCP proxy server. Specifically, multipath MPTCP transmission is performed between the terminal and the MPTCP proxy server, and single-path TCP transmission is performed between the MPTCP proxy server and a service server in which a service that needs to be performed by the terminal is located. However, in this case, security of a plurality of paths accessed by the terminal cannot be ensured. Consequently, security of data transmission of the terminal is severely affected. Therefore, a multipath establishment method that can improve data transmission security is urgently needed.

SUMMARY

Aspects of this application provides a multipath establishment method and apparatus, to resolve a problem of relatively low security of data transmission in a related art. The technical solutions are as follows:

According to a first aspect, a multipath establishment method is provided, applied to a proxy device. The method includes:

performing identity authentication on a terminal that accesses a first network via a first network access device;

performing an admission check on the terminal that accesses a second network via a second network access device; and after both the identity authentication and the admission check of the terminal succeed, establishing a first path between the terminal and a service server via the first network, and establishing a second path between the terminal and the service server via the second network, where the first path and the second path are used to perform data transmission between the terminal and the service server.

It should be noted that the first network access device is configured to access the first network, and the first network implements communication by using a base station. In other words, the first network may be a network that complies with the 3GPP specifications. For example, the first network may be a long term evolution (LTE) network.

In addition, the second network access device is configured to access the second network, where the second network is a network other than the first network. The second network does not need to implement communication by using a base station. In other words, the second network may be a network that does not comply with the 3GPP specifications. For example, the second network may be a digital subscriber line (DSL) network, a Wi-Fi network, or the like. That the terminal accesses the second network via the second network access device is that the terminal attaches to the second network.

Moreover, the proxy device is configured to perform user authentication, that is, perform identity authentication, an admission check, and the like on the terminal. During actual application, the proxy device may be a system manager or a proxy server. The system manager may provide management and allocation of proxy servers in a multi-proxy server (that is, a proxy server cluster) deployment. To be specific, the system manager may allocate a relatively appropriate proxy server to the terminal. The proxy server is configured to implement multipath access of the terminal in the MPTCP. To be specific, the proxy server may provide an MPTCP proxy function. The proxy server may perform MPTCP transmission with the terminal, and perform TCP transmission with the service server.

In this embodiment of this application, after the terminal accesses the first network via the first network access device, the proxy device performs identity authentication on the terminal; after the terminal accesses the second network via the second network access device, the proxy device performs an admission check on the terminal; and after both the identity authentication and the admission check of the terminal succeed, it indicates that multipath access of the terminal is valid. Therefore, the proxy server establishes the first path between the terminal and the service server via the first network, and establishes the second path between the terminal and the service server via the second network. In this case, the established first path and second path have relatively high security. Therefore, security of subsequent data transmission of the terminal can be ensured.

The performing identity authentication on a terminal that accesses a first network via a first network access device includes:

receiving an identity authentication request that carries a first network address and that is sent by the first network access device, where the first network address is a network address allocated by the first network access device to the terminal; and performing identity authentication on the terminal based on the first network address, to obtain an identity authentication result of the terminal.

In this embodiment of this application, the first network address allocated by the first network access device to the terminal is an internet protocol (IP) address of the terminal in the first network, and the proxy device may accurately perform identity authentication on the terminal based on the first network address allocated by the first network access device to the terminal. Therefore, validity of the terminal via the first network can be effectively determined.

The performing an admission check on the terminal that accesses a second network via a second network access device includes:

receiving a first admission check request that carries a physical address of the terminal and that is sent by the second network access device;

sending a login status query request carrying the physical address to an authentication server, so that the authentication server queries a login status of the physical address;

receiving the login status that is of the physical address and that is sent by the authentication server; and determining an admission check result of the terminal based on the login status of the physical address.

It should be noted that the authentication server is configured to provide a security management mechanism for performing access control in network security. The authentication server may record a login status of a physical address of a device on which access authentication succeeds in the authentication server.

In this embodiment of this application, the proxy device may learn, by using the login status that is of the physical address of the terminal and that is obtained from the authentication server, whether the terminal is currently connected to the second network, and accurately perform an admission check on the terminal based on the login status, so that validity of the terminal via the second network can be effectively determined.

After the establishing a first path between the terminal and a service server via the first network, and establishing a second path between the terminal and the service server via the second network, the method further includes:

if it is detected that no data is transmitted on the second path within preset duration, sending the login status query request carrying the physical address to the authentication server, so that the authentication server queries the login status of the physical address;

receiving the login status that is of the physical address and that is sent by the authentication server; and deleting the second path if the login status of the physical address is an offline state.

In this embodiment of this application, when the proxy server detects that no data is transmitted on the second path within the preset duration, it indicates that the terminal has not used the second path for a relatively long time. Therefore, in this case, the proxy server may trigger to query whether the terminal is offline. To be specific, the proxy server may obtain the login status of the physical address of the terminal from the authentication server. When the login status of the physical address of the terminal is an offline state, it indicates that the terminal is not connected to the second network at this moment. Therefore, the proxy server may delete the second path, to effectively avoid a waste of network resources.

The performing an admission check on the terminal that accesses a second network via a second network access device includes:

receiving a second admission check request that carries a second network address and that is sent by the second network access device, where the second network address is a network address allocated by the second network access device to the terminal; and determining an admission check result of the terminal based on the second network address and a preset admission address range.

In this embodiment of this application, the second network address allocated by the second network access device to the terminal is an IP address of the terminal in the second network, and the proxy device may accurately perform an admission check on the terminal based on the second network address allocated by the second network access device to the terminal. Therefore, validity of the terminal via the second network can be effectively determined.

The establishing a first path between the terminal and a service server via the first network, and establishing a second path between the terminal and the service server via the second network includes:

receiving a network address of the service server that is sent by the terminal; and if a stored service whitelist includes the network address of the service server, or if a stored service blacklist does not include the network address of the service server, establishing the first path between the terminal and the service server via the first network, and establishing the second path between the terminal and the service server via the second network.

In this embodiment of this application, the proxy device may establish the first path between the terminal and the service server via the first network and establish the second path between the terminal and the service server via the second network when the service whitelist includes the network address of the service server or when the service blacklist does not include the network address of the service server. In this case, the established first path and second path not only have relatively high security, but also meet a service access requirement. Therefore, security of subsequent data transmission of the terminal can be further ensured.

According to a second aspect, a multipath establishment method is provided, applied to a terminal. The method includes:

after a first network is accessed via a first network access device, performing identity authentication by using a proxy device, where the first network implements communication by using a base station;

after a second network is accessed via a second network access device, performing an admission check by using the proxy device;

after both the identity authentication and the admission check succeed, obtaining a network address of a service server;

if a stored service whitelist includes the network address of the service server, or if a stored service blacklist does not include the network address of the service server, establishing a first path to the service server via the first network, and establishing a second path to the service server via the second network, where the service whitelist or the service blacklist is obtained from the proxy device; and performing data transmission with the service server by using the first path and the second path.

In this embodiment of this application, after accessing the first network via the first network access device, the terminal performs identity authentication by using the proxy device. After accessing the second network via the second network access device, the terminal performs an admission check by using the proxy device. After both the identity authentication and the admission check of the terminal succeed, it indicates that multipath access of the terminal is valid. In this case, the terminal may obtain the network address of the service server. When the service whitelist includes the network address of the service server, or when the service blacklist does not include the network address of the service server, the terminal establishes the first path to the service server via the first network, and establishes the second path to the service server via the second network. In this case, the established first path and second path not only have relatively high security, but also meet a service access requirement. Then, the terminal performs data transmission with the service server by using the first path and the second path. Therefore, security of data transmission of the terminal can be effectively ensured.

According to a third aspect, a multipath establishment apparatus is provided. The multipath establishment apparatus has a function of implementing the multipath establishment method according to the first aspect. The multipath establishment apparatus includes at least one module, and the at least one module is configured to implement the multipath establishment method provided in the first aspect.

According to a fourth aspect, a multipath establishment apparatus is provided. The multipath establishment apparatus has a function of implementing a behavior of the multipath establishment method according to the second aspect. The multipath establishment apparatus includes at least one module, and the at least one module is configured to implement the multipath establishment method provided in the second aspect.

According to a fifth aspect, a multipath establishment apparatus is provided. A structure of the multipath establishment apparatus includes a processor and a memory. The memory is configured to store a program that supports the multipath establishment apparatus in performing the multipath establishment method provided in the first aspect, and store data used to implement the multipath establishment method in the first aspect. The processor is configured to execute the program stored in the memory. The multipath establishment apparatus may further include a communication bus. The communication bus is used to establish a connection between the processor and the memory.

According to a sixth aspect, a multipath establishment apparatus is provided. A structure of the multipath establishment apparatus includes a processor and a memory. The memory is configured to store a program that supports the multipath establishment apparatus in performing the multipath establishment method provided in the second aspect, and store data used to implement the multipath establishment method in the second aspect. The processor is configured to execute the program stored in the memory. The multipath establishment apparatus may further include a communication bus. The communication bus is used to establish a connection between the processor and the memory.

According to a seventh aspect, a computer-readable storage medium is provided. The computer-readable storage medium stores an instruction. When the instruction is run on a computer, the computer is enabled to perform the multipath establishment method according to the first aspect.

According to an eighth aspect, a computer-readable storage medium is provided. The computer-readable storage medium stores an instruction. When the instruction is run on a computer, the computer is enabled to perform the multipath establishment method according to the second aspect.

According to a ninth aspect, a computer program product including an instruction is provided. When the computer program product runs on a computer, the computer is enabled to perform the multipath establishment method according to the first aspect.

According to a tenth aspect, a computer program product including an instruction is provided. When the computer program product runs on a computer, the computer is enabled to perform the multipath establishment method according to the second aspect.

Technical effects achieved in the third aspect, the fifth aspect, the seventh aspect, and the ninth aspect are similar to technical effects achieved by using corresponding technical means in the first aspect. Details are not described herein.

Technical effects achieved in the fourth aspect, the sixth aspect, the eighth aspect, and the tenth aspect are similar to technical effects achieved by using corresponding technical means in the second aspect. Details are not described herein.

A beneficial effect brought by the technical solutions provided in this application is as follows: After the terminal accesses the first network via the first network access device, the proxy device performs identity authentication on the terminal; after the terminal accesses the second network via the second network access device, the proxy device performs an admission check on the terminal; and after both the identity authentication and the admission check of the terminal succeed, it indicates that multipath access of the terminal is valid. Therefore, the first path may be established between the terminal and the service server via the first network, and the second path may be established between the terminal and the service server via the second network. In this case, the established first path and second path have relatively high security. Then, data transmission is performed between the terminal and the service server by using the first path and the second path, so that security of data transmission of the terminal can be ensured.

DESCRIPTION OF EMBODIMENTS

To make the objectives, technical solutions, and advantages of this application clearer, the following further describes the embodiments of this application in detail with reference to the accompanying drawings.

Before the embodiments of this application are described in detail, a system architecture related to the embodiments of this application is described first.

Figure 1A:
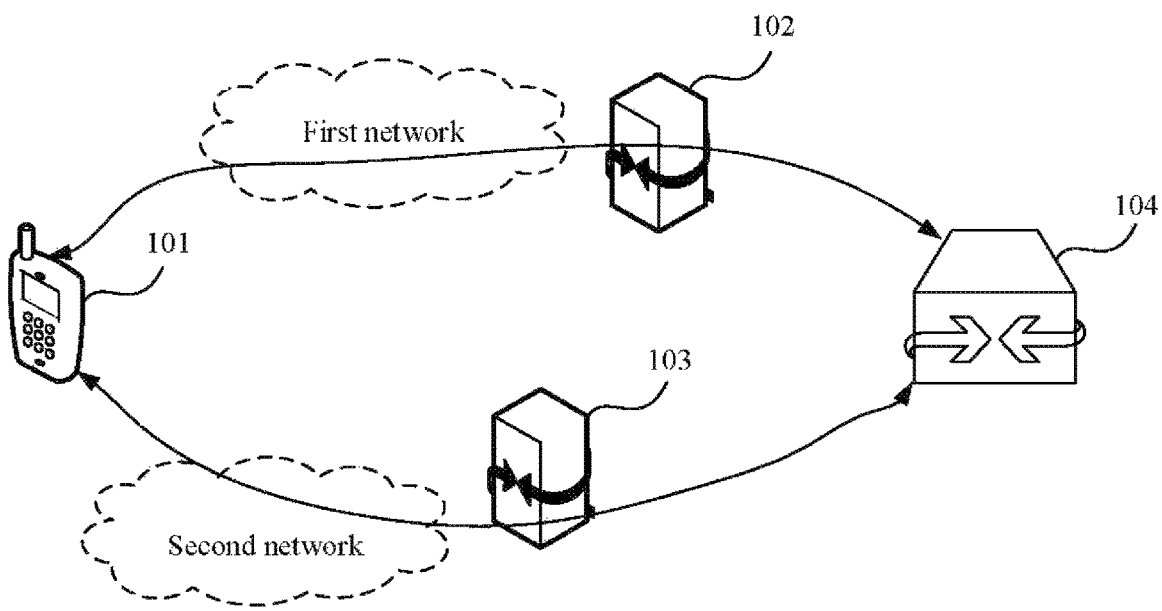
FIG. 1A is a schematic structural diagram of a communications system according to an embodiment of this application.

Referring to FIG. 1A, a communications system related to an embodiment of this application includes a terminal 101, a first network access device 102, a second network access device 103, and a proxy device 104.

The terminal 101 may access a first network via the first network access device 102, and may access a second network via the second network access device 103. After the terminal 101 accesses the first network, the first network access device 102 may perform identity authentication on the terminal 101 by using the proxy device 104; after the terminal 101 accesses the second network, the second network access device 103 may perform an admission check on the terminal 101 by using the proxy device 104. After both the identity authentication and the admission check of the terminal 101 succeed, a first path between the terminal 101 and a service server may be established via the first network, and a second path between the terminal 101 and the service server may be established via the second network. The terminal 101 may perform data transmission with the service server by using the first path and the second path.

Figure 1B:
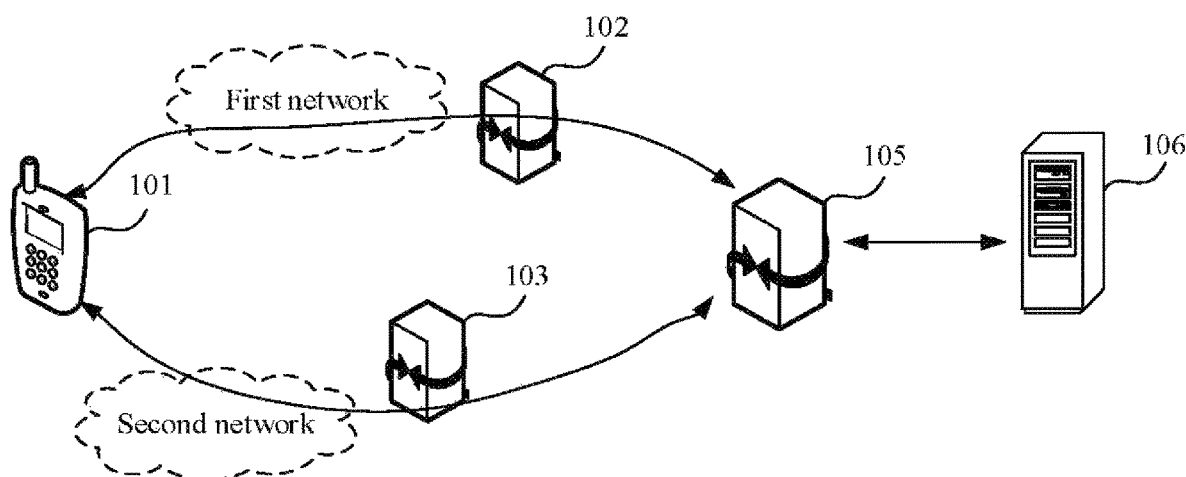
FIG. 1B is a schematic structural diagram of another communications system according to an embodiment of this application.

Further, referring to FIG. 1B, the communications system may further include a proxy server 105 and a service server 106.

When the first path and the second path are established between the terminal 101 and the service server 106, a subflow may be first established between the terminal 101 and the proxy server 105 via the first network, another subflow may be established between the terminal 101 and the proxy server 105 via the second network, and then a connection is established between the proxy server 105 and the service server 106, so that the first path and the second path are established between the terminal 101 and the service server 106. In this case, MPTCP transmission is performed between the terminal 101 and the proxy server 105, and TCP transmission is performed between the proxy server 105 and the service server 106, so that the terminal 101 can perform a service with the service server 106 by using a plurality of paths.

Figure 2A:
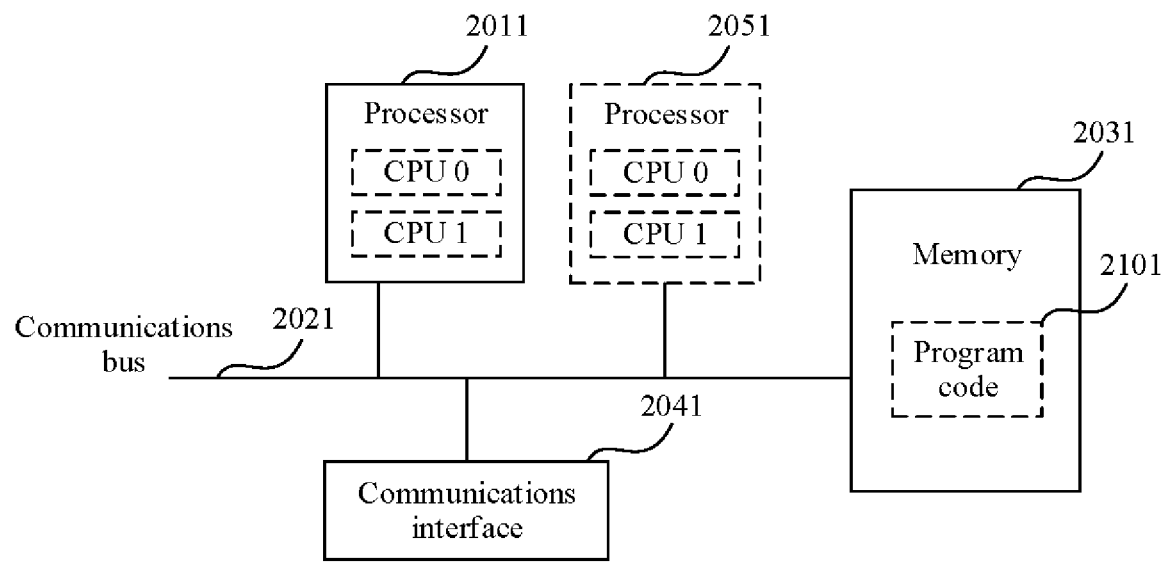
FIG. 2A is a schematic structural diagram of a computer device according to an embodiment of this application.

FIG. 2A is a schematic structural diagram of a computer device according to an embodiment of this application. The computer device may be the proxy device 104 shown in FIG. 1A. Referring to FIG. 2A, the computer device includes at least one processor 2011, a communications bus 2021, a memory 2031, and at least one communications interface 2041.

The processor 2011 may be a general-purpose central processing unit (CPU), a microprocessor, an application-specific integrated circuit (ASIC), or one or more integrated circuits configured to control program execution in the solutions of this application.

The communications bus 2021 may include a channel for transmitting information between the foregoing components.

The memory 2031 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage medium, an optical disc storage medium (including a compressed optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer, but is not limited thereto. The memory 2031 may exist independently and is connected to the processor 2011 by using the communications bus 2021. The memory 2031 may alternatively be integrated with the processor 2011.

The communications interface 2041 is configured to communicate, by using any apparatus such as a transceiver, with another device or a communications network such as the Ethernet, a radio access network (RAN), or a wireless local area network (WLAN).

During specific implementation, in an embodiment, the processor 2011 may include one or more CPUs, for example, a CPU 0 and a CPU 1 shown in FIG. 2A.

During specific implementation, in an embodiment, the computer device may include a plurality of processors, for example, the processor 2011 and a processor 2051 shown in FIG. 2A. Each of the processors may be a single-core processor (single-CPU) or may be a multi-core processor (multi-CPU). The processor herein may be one or more devices, circuits, and/or processing cores for processing data (for example, a computer program instruction).

The memory 2031 is configured to store program code 2101 for executing the solutions of this application, and the processor 2011 is configured to execute the program code 2101 stored in the memory 2031. The computer device may implement, by using the processor 2011 and the program code 2101 in the memory 2031, operations performed by a proxy device in a multipath establishment method provided in an embodiment in FIG. 3 below.

Figure 2B:
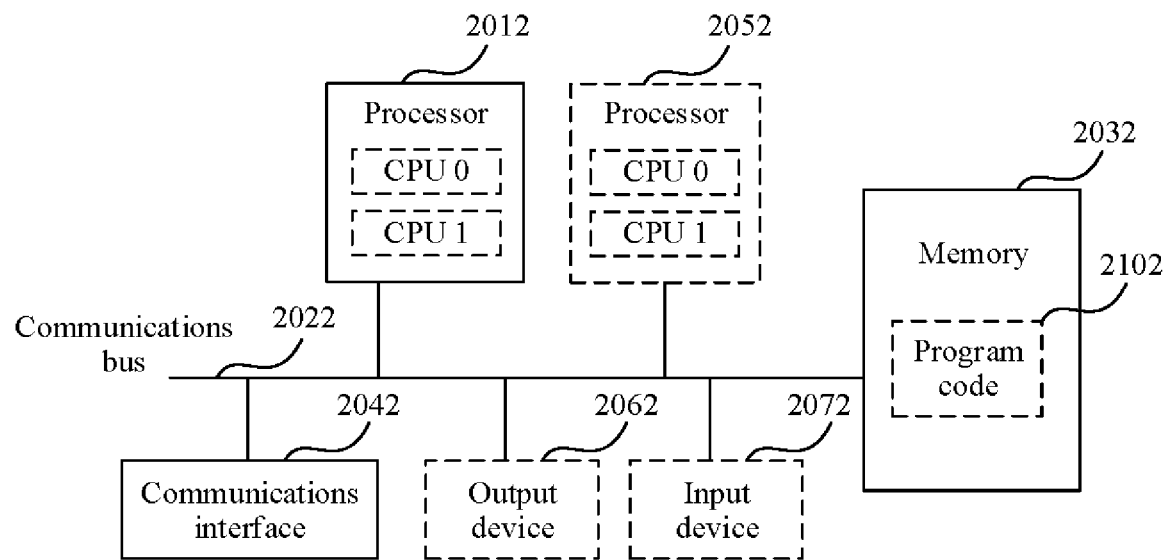
FIG. 2B is a schematic structural diagram of another computer device according to an embodiment of this application.

FIG. 2B is a schematic structural diagram of a computer device according to an embodiment of this application. The computer device may be the terminal 101 shown in FIG. 1A or FIG. 1B. Referring to FIG. 2B, the computer device includes at least one processor 2012, a communications bus 2022, a memory 2032, and at least one communications interface 2042.

The processor 2012 may be a general-purpose CPU, a microprocessor, an ASIC, or one or more integrated circuits configured to control program execution of the solutions of this application.

The communications bus 2022 may include a channel for transmitting information between the foregoing components.

The memory 2032 may be a ROM or another type of static storage device that can store static information and an instruction, or a RAM or another type of dynamic storage device that can store information and an instruction, or may be an EEPROM, a CD-ROM or another compact disc storage medium, an optical disc storage medium (including a compressed optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer, but is not limited thereto. The memory 2032 may exist independently and is connected to the processor 2012 by using the communications bus 2022. The memory 2032 may alternatively be integrated with the processor 2012.

The communications interface 2042 is configured to communicate, by using any apparatus such as a transceiver, with another device or a communications network, such as the Ethernet, a RAN, or a WLAN.

During specific implementation, in an embodiment, the processor 2012 may include one or more CPUs, for example, a CPU 0 and a CPU 1 shown in FIG. 2B.

During specific implementation, in an embodiment, the computer device may include a plurality of processors, for example, the processor 2012 and a processor 2052 shown in FIG. 2B. Each of these processors may be a single-CPU, or may be a multi-CPU. The processor herein may be one or more devices, circuits, and/or processing cores for processing data (for example, a computer program instruction).

During specific implementation, in an embodiment, the computer device may further include an output device 2062 and an input device 2072. The output device 2062 communicates with the processor 2012, and may display information in a plurality of manners. For example, the output device 2062 may be a liquid crystal display (LCD), a light emitting diode (LED) display device, a cathode ray tube (CRT) display device, a projector, or the like. The input device 2072 communicates with the processor 2012, and may receive an input of a user in a plurality of manners. For example, the input device 2072 may be a mouse, a keyboard, a touchscreen device, a sensing device, or the like.

The memory 2032 is configured to store program code 2102 for executing the solutions of this application, and the processor 2012 is configured to execute the program code 2102 stored in the memory 2032. The computer device may implement, by using the processor 2012 and the program code 2102 in the memory 2032, operations performed by a terminal in the multipath establishment method provided in the embodiment in FIG. 3 below.

Figure 3:
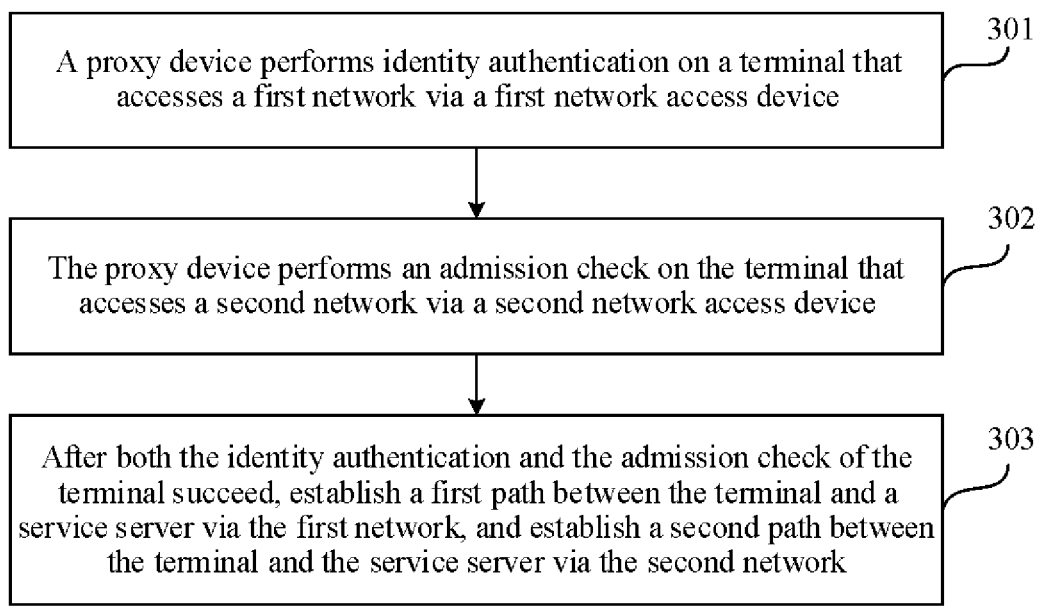
FIG. 3 is a flowchart of a multipath establishment method according to an embodiment of this application.

FIG. 3 is a flowchart of a multipath establishment method according to an embodiment of this application. Referring to FIG. 3, the method includes the following steps.

Step 301: A proxy device performs identity authentication on a terminal that accesses a first network via a first network access device.

It should be noted that the first network access device is configured to access the first network. For example, the first network access device may be a packed data network gateway (PGW), a serving gateway (SGW), or the like.

In addition, the first network implements communication by using a base station, that is, the first network may be a network that complies with 3GPP specifications. For example, the first network may be an LTE network. That the terminal accesses the first network via the first network access device is that the terminal attaches to the first network.

Moreover, the proxy device is configured to perform user authentication, that is, perform identity authentication, an admission check, and the like on the terminal. During actual application, the proxy device may be a system manager or a proxy server. The system manager may be referred to as an MP-manager. The system manager may provide management and allocation of proxy servers when a plurality of proxy servers (that is, a proxy server cluster) are deployed. That is, the system manager may allocate a relatively appropriate proxy server to the terminal, for example, may allocate a proxy server that is relatively close to the first network access device to the terminal for use. The proxy server is configured to implement MPTCP-based multipath access of the terminal. To be specific, the proxy server may provide an MPTCP proxy function. The proxy server may perform MPTCP transmission with the terminal, and perform TCP transmission with a service server. For example, the proxy server may be a multipath gateway (MPGW), a hybrid access gateway (HAG), or the like.

Specifically, the operation in step 301 may be: allocating, by the first network access device, a first network address to the terminal after the terminal accesses the first network via the first network access device; sending, by the first network access device, an identity authentication request carrying the first network address to the proxy device; and performing, by the proxy device when receiving the identity authentication request, identity authentication on the terminal based on the first network address, to obtain an identity authentication result of the terminal.

It should be noted that the first network address allocated by the first network access device to the terminal is an IP address of the terminal in the first network. For example, the first network address may be an internet protocol version 4 (IPv4) address, an internet protocol version 6 (IPv6) address, or the like. This is not limited in this embodiment of this application.

In addition, a process in which the first network access device sends the identity authentication request carrying the first network address to the proxy device may be implemented based on a copy mechanism of a remote authentication dial-in user service (RADIUS). In this case, the identity authentication request may be a RADIUS message, and the first network access device notifies the proxy device of the first network address by using the RADIUS message.

When the proxy device performs identity authentication on the terminal based on the first network address to obtain the identity authentication result of the terminal, if the first network address is within a preset network address range, the proxy device may determine that the identity authentication of the terminal succeeds; if the first network address is not within the preset network address range, the proxy device may determine that the identity authentication of the terminal fails. In this way, the proxy device obtains the identity authentication result of the terminal.

It should be noted that the preset network address range may be set in advance, and may be set based on a network status and an application policy of an operator. For example, network addresses in the preset network address range may be some predetermined network addresses with relatively high security. This is not limited in this embodiment of this application.

It should be noted that, during actual application, the identity authentication request may carry not only the first network address, but also other information related to an identity of the terminal, for example, may further carry an international mobile subscriber identity (IMSI) and an access point name (APN) of the terminal. Then, the proxy device may perform identity authentication on the terminal based on the first network address and the other information related to the identity of the terminal that are carried in the identity authentication request, to obtain the identity authentication result of the terminal.

Step 302: The proxy device performs an admission check on the terminal that accesses a second network via a second network access device.

It should be noted that the second network access device is configured to access the second network. For example, the second network access device may be a broadband remote access server (BRAS), a broadband network gateway (BNG), an evolved packet data gateway (ePDG), a transparent gateway (TGW), or the like.

In addition, the second network is a network other than the first network. The second network does not need to implement communication by using the base station. In other words, the second network may be a network that does not comply with the 3GPP specifications. For example, the second network may be a DSL network, a Wi-Fi network, or the like. In addition, when the second network is the Wi-Fi network, the second network may be a self-built Wi-Fi network, or may be a cooperative Wi-Fi network. That the terminal accesses the second network via the second network access device is that the terminal attaches to the second network.

Specifically, the operation in step 302 may include the following two manners.

Manner 1: After the terminal accesses the second network via the second network access device, the second network access device obtains a physical address of the terminal, and sends a first admission check request carrying the physical address to the proxy device. When receiving the first admission check request, the proxy device sends a login status query request carrying the physical address to an authentication server. When receiving the login status query request, the authentication server queries a login status of the physical address, and sends the login status of the physical address to the proxy device. When receiving the login status of the physical address, the proxy device determines an admission check result of the terminal based on the login status of the physical address.

It should be noted that the authentication server is configured to provide a security management mechanism for performing access control in network security. The authentication server may record a login status of a physical address of a device on which access authentication succeeds in the authentication server. For example, the authentication server may be an authentication authorization accounting (AAA) server.

In addition, when a device attempts to access the second network, access authentication needs to be performed on the device in the authentication server. In addition, when access authentication performed on the device succeeds in the authentication server, the authentication server records a login status of a physical address of the device. In addition, when the login status of the physical address of the device is an online state, it indicates that the device is currently connected to the second network, or when the login status of the physical address of the device is an offline state, it indicates that the device is currently not connected to the second network.

Moreover, the physical address of the terminal is a hardware address of the terminal, and is also referred to as a media access control (MAC) address. The physical address of the terminal may uniquely identify the terminal.

When the proxy device determines the admission check result of the terminal based on the login status of the physical address, when the login status of the physical address of the terminal is an online state, the proxy device may determine that the admission check of the terminal succeeds, or when the login status of the physical address of the terminal is an offline state, the proxy device may determine that the admission check of the terminal fails. In this way, the proxy device obtains the admission check result of the terminal.

When the second network access device obtains the physical address of the terminal, the second network access device may actively obtain the physical address of the terminal from the terminal. Alternatively, the terminal may actively send the physical address of the terminal to the second network access device. In this case, the terminal may first obtain an address of the proxy device, and then report the physical address of the terminal to the proxy device based on the address of the proxy device. A process in which the terminal reports the physical address of the terminal to the proxy device is a process in which the terminal actively sends the physical address of the terminal to the second network access device, and then the second network access device sends the first admission check request carrying the physical address to the proxy device.

When obtaining the address of the proxy device, the terminal may send an address query request carrying a domain name of the proxy device to the first network access device or the second network access device. When the first network access device or the second network access device receives the address query request, if the address of the proxy device is already stored, the first network access device or the second network access device sends the address of the proxy device to the terminal, or if the address of the proxy device is not stored, the first network access device or the second network access device obtains an address corresponding to the domain name of the proxy device from the domain name server, uses the obtained address as the address of the proxy device, and sends the obtained address to the terminal.

Manner 2: After the terminal accesses the second network via the second network access device, the second network access device allocates a second network address to the terminal. The second network access device sends a second admission check request carrying the second network address to the proxy device. When receiving the second admission check request, the proxy device determines an admission check result of the terminal based on the second network address and a preset admission address range.

It should be noted that the second network address allocated by the second network access device to the terminal is an IP address of the terminal in the second network. For example, the second network address may be an internet protocol version 4 address, an internet protocol version 6 address, or the like. This is not limited in this embodiment of this application.

In addition, the preset network address range may be set in advance, and may be set based on a network status and an application policy of an operator. For example, the preset network address range may include 161.1.1.0 to 161.1.1.255, 161.1.2.0 to 161.1.2.255, 10.111.0.0 to 10.111.255.255, and the like.

When the proxy device determines the admission check result of the terminal based on the second network address and the preset admission address range, when the second network address is located in the preset admission address range, the proxy device may determine that an admission check of the terminal succeeds, or when the second network address is located outside the preset admission address range, the proxy device may determine that the admission check of the terminal fails. In this way, the proxy device obtains the admission check result of the terminal.

Step 303: After both the identity authentication and the admission check of the terminal succeed, establish a first path between the terminal and the service server via the first network, and establish a second path between the terminal and the service server via the second network.

It should be noted that the first path and the second path are used for data transmission between the terminal and the service server, that is, after the first path is established between the terminal and the service server via the first network, and the second path is established between the terminal and the service server via the second network, the first path and the second path may be used for data transmission between the terminal and the service server.

In addition, when both the identity authentication and the admission check of the terminal succeed, it indicates that multipath access of the terminal is valid. In this case, when the terminal needs to perform a service with the service server, the first path may be established between the terminal and the service server via the first network, and the second path may be established between the terminal and the service server via the second network. Security of the established first path and second path in this case is relatively high, and security of subsequent data transmission of the terminal can be ensured.

It should be noted that, after both the identity authentication and the admission check of the terminal succeed, the proxy device may generate a third address corresponding to the first network address and the second network address, and allocate the third address to the terminal. A subsequent process in which the first path is established between the terminal and the service server via the first network, and the second path is established between the terminal and the service server via the second network is a process in which the terminal establishes a path to the service server by using the proxy server, that is, the terminal establishes a subflow to the service server based on the first network address, and establishes another subflow to the service server based on the second network address, and the proxy server establishes a connection to the service server based on the third address, to establish the first path and the second path between the terminal and the service server.

In addition, the third address is a generic IP address of the terminal, and the third address may be used when a connection is established between the proxy server and the service server. For example, the third address may be an IPv4 address, an IPv6 address, or the like. This is not limited in this embodiment of this application.

Specifically, after both the identity authentication and the admission check of the terminal succeed, the first path may be directly established between the terminal and the service server via the first network, and the second path may be directly established between the terminal and the service server via the second network. Certainly, alternatively, the first path may be established between the terminal and the service server via the first network and the second path may be established between the terminal and the service server via the second network based on a preset service policy. In this case, the path establishment operation may include the following manner 1 or manner 2.

Manner 1: The terminal obtains a network address of the service server, and if a stored service whitelist includes the network address of the service server, or if a stored service blacklist does not include the network address of the service server, the terminal establishes the first path to the service server via the first network, and establishes the second path to the service server via the second network.

Further, if the stored service whitelist does not include the network address of the service server, or if the stored blacklist includes the network address of the service server, the terminal does not establish the first path to the service server via the first network, and does not establish the second path with the service server via the second network, instead, the terminal follows a conventional TCP link establishment procedure, and establishes a single path to the service server.

It should be noted that the service whitelist stores a network address of a service server in which a service on which multipath acceleration can be performed is located, that is, when needing to perform a service with the service server indicated by the network address stored in the service whitelist, the terminal may directly perform multipath link establishment and data transmission based on an MPTCP link establishment procedure.

In addition, the service blacklist stores a network address of a service server in which a service on which multipath acceleration cannot be performed is located, that is, when needing to perform a service with the service server indicated by the network address stored in the service whitelist, the terminal cannot perform multipath link establishment, but needs to perform single-path establishment and single flow transmission based on the conventional TCP link establishment procedure.

It should be noted that, to facilitate establishment of a path between the terminal and the service server by using the proxy server, after both the identity authentication and the admission check of the terminal succeed, the proxy device may further send a receive port number of the proxy server to the terminal while allocating the third address to the terminal. Specifically, if the proxy device is a proxy server, the proxy device may send a local receive port number to the terminal, so that the terminal subsequently establishes a subflow to the proxy device based on the receive port number, and then establishes a path to the service server. If the proxy device is a system manager, the proxy device may allocate a proxy server to the terminal, and send an address and a receive port number of the proxy server to the terminal, so that the terminal subsequently establishes a subflow to the proxy server based on the address and the receive port number of the proxy server, and then establishes a path to the service server.

When the proxy device is to allocate a proxy server to the terminal, the proxy device may obtain an address of the first network access device, select one proxy server from a plurality of managed proxy servers based on the address of the first network access device, and allocate the proxy server to the terminal, and for example, may select a proxy server closest to the first network access device and allocate the proxy server to the terminal.

When the proxy device is to obtain the address of the first network access device, the proxy device may actively obtain the address of the first network access device from the first network access device, or the first network access device may actively send the address of the first network access device to the proxy device.

A process in which the first network access device actively sends the address of the first network access device to the proxy device may be implemented based on a RADIUS copy mechanism. In this case, the first network access device may notify the proxy device of the address of the first network access device by using a RADIUS message. In this case, to reduce a quantity of times of interaction, the first network access device may copy a RADIUS message carrying the address of the first network access device and the first network address required for performing identity authentication on the terminal in step 301 to the proxy device.

Further, before step 303, that is, after the terminal accesses the first network via the first network access device and accesses the second network via the second network access device, the terminal may further obtain the service whitelist or the service blacklist from the proxy device. Specifically, the terminal may send a policy control request (PCR) to the proxy device. When receiving the PCR, the proxy device may send the stored service whitelist or service blacklist to the terminal. In this case, to reduce a quantity of times of interaction, the terminal may send the PCR carrying the physical address that is of the terminal and that is required for performing the admission check on the terminal in the manner 1 in step 302 to the proxy device.

Manner 2: The terminal obtains a network address of the service server, and sends the network address of the service server to the proxy device; when the proxy device receives the network address of the service server, if a stored service whitelist includes the network address of the service server, or if a stored service blacklist does not include the network address of the service server, the proxy device establishes the first path between the terminal and the service server via the first network, and establishes the second path between the terminal and the service server via the second network.

If the proxy device is a proxy server, when the terminal sends the network address of the service server to the proxy device, the terminal may send the network address of the service server to the proxy device in a process of establishing a target path to the service server. When the proxy device receives the network address of the service server, if the stored service whitelist includes the network address of the service server, or if the stored service blacklist does not include the network address of the service server, the proxy device continues to establish the target path between the terminal and the service server, and then establishes a path other than the target path between the terminal and the service server. However, if the stored service whitelist does not include the network address of the service server, or if the stored service blacklist includes the network address of the service server, the proxy device interrupts the establishment of the target path between the terminal and the service server, and does not establish a path other than the target path between the terminal and the service server, but indicates the terminal to follow a conventional TCP link establishment procedure, and the terminal establishes a single path to the service server.

It should be noted that the target path is a path that needs to be preferentially established in the first path and the second path, and a path other than the target path is the other path different from the target path in the first path and the second path.

In addition, when the terminal sends the network address of the service server to the proxy device in the process of establishing the target path to the service server, the terminal may send the network address of the service server to the proxy device in the process of establishing a first subflow to the proxy device, or the terminal may send the network address of the service server to the proxy device after completing the establishment of the first subflow to the proxy device. This is not limited in this embodiment of this application.

Moreover, when the proxy device is the proxy server, to facilitate the establishment of the path performed by the terminal to the service server through the proxy device, after both the identity authentication and the admission check of the terminal succeed, the proxy device may further send the local receive port number to the terminal while allocating the third address to the terminal, so that the terminal may subsequently establish the subflow to the proxy device based on the receive port number, and then establish the path to the service server.

If the proxy device is a system management device, when the terminal sends the network address of the service server to the proxy device, the terminal may send the network address of the service server to the proxy device before establishing the target path to the service server. When the proxy device receives the network address of the service server, if a stored service whitelist includes the network address of the service server, or if a stored service blacklist does not include the network address of the service server, the system manager allocates a proxy server to the terminal, and sends an address and a receive port number of the proxy server to the terminal, so that the terminal establishes two subflows with the proxy server based on the address and the receive port number of the proxy server, and then establishes the first path and the second path to the service server. However, if a stored service whitelist does not include the network address of the service server, or if a stored service blacklist includes the network address of the service server, the proxy device indicates the terminal to follow a conventional TCP link establishment procedure, and the terminal establishes a single path to the service server.

It should be noted that during actual application, the foregoing manner 1 and manner 2 may be simultaneously used, and a service policy result of the manner 2 may be preferentially used when service policy results of the manner 1 and the manner 2 are inconsistent. This is not limited in this embodiment of this application.

In addition, the service whitelist or the service blacklist stored in the proxy device may be generated by the proxy device, or may be dynamically delivered by another device, for example, may be dynamically delivered by a policy and charging rules function (PCRF) unit. This is not limited in this embodiment of this application.

Moreover, when the service whitelist or the service blacklist is generated by the proxy device, if the proxy device updates the stored service whitelist or service blacklist, after the update is completed, the proxy device may actively send the updated service whitelist or service blacklist to the terminal. When the service whitelist or the service blacklist is dynamically delivered by another device, if the another device updates the stored service whitelist or service blacklist, after the update is completed, the another device may send the updated service whitelist or service blacklist to the proxy device, and when receiving the updated service whitelist or service blacklist, the proxy device may send the updated service whitelist or service blacklist to the terminal.

Further, after step 303, the first or second path may alternatively be deleted.

When the first path is to be deleted, the terminal may send a first path delete request to the first network access device, and when receiving the first path delete request, the first network access device may delete the first path. Alternatively, when detecting that no data is transmitted on the first path within preset duration, the proxy server or the system management device may delete the first path.

When the second path is to be deleted, the terminal may send a second path delete request to the second network access device, and when receiving the second path delete request, the second network access device may delete the second path. Alternatively, when detecting that no data is transmitted on the second path within preset duration, the proxy server or the system management device may delete the second path. Alternatively, when detecting that no data is transmitted on the second path within preset duration, the proxy server or the system management device may send, to an authentication server, a login status query request carrying the physical address of the terminal. When receiving the login status query request, the authentication server queries a login status of the physical address, and sends the login status of the physical address to the proxy server or the system management device. When receiving the login status of the physical address, the proxy server or the system management device deletes the second path if the login status of the physical address is an offline state.

It should be noted that the preset duration may be set in advance, and the preset duration may be set to be relatively long. For example, the preset duration may be one hour, two hours, three hours, or the like.

In addition, when the proxy server or the system management device detects that no data is transmitted on the first path or the second path within the preset duration, it indicates that the terminal has not used the first path or the second path for a relatively long time. Therefore, in this case, the proxy server or the system management device may directly delete the first path or the second path, or may further confirm the second path. To be specific, the proxy server or the system management device may obtain the login status of the physical address of the terminal. When the login status of the physical address of the terminal is an offline state, it indicates that the terminal is not connected to the second network at this moment. Therefore, the proxy server or the system management device may delete the second path.

Moreover, when the first network access device deletes the first path or the second network access device deletes the second path, the first network access device or the second network access device may send a path delete notification message to the system management device and the proxy server, so that both the system management device and the proxy server may delete a context resource of the first path or the second path after a specific duration (for example, after a service keepalive timer expires). When one party of the proxy server or the system management device deletes the first path or the second path, the party may send a path delete notification to the other party, so that both the system management device and the proxy server may delete the context resource of the first path or the second path after the specific duration.

In this embodiment of this application, after the terminal accesses the first network via the first network access device, the proxy device performs identity authentication on the terminal; after the terminal accesses the second network via the second network access device, the proxy device performs an admission check on the terminal; and after both the identity authentication and the admission check of the terminal succeed, it indicates that multipath access of the terminal is valid. Therefore, the first path may be established between the terminal and the service server via the first network, and the second path may be established between the terminal and the service server via the second network. In this case, the established first path and second path have relatively high security. Then, data transmission is performed between the terminal and the service server by using the first path and the second path, so that security of data transmission of the terminal can be ensured.

It should be noted that the multipath establishment method provided in the embodiment in FIG. 3 mainly relates to a path establishment operation, a path delete operation, an operation of obtaining a service policy by the terminal, a service policy update operation, and a service policy control operation. The following uses an example in which the proxy device is a proxy server to describe the six operations in detail.

Path Establishment Operation

Figures 1, 4A:
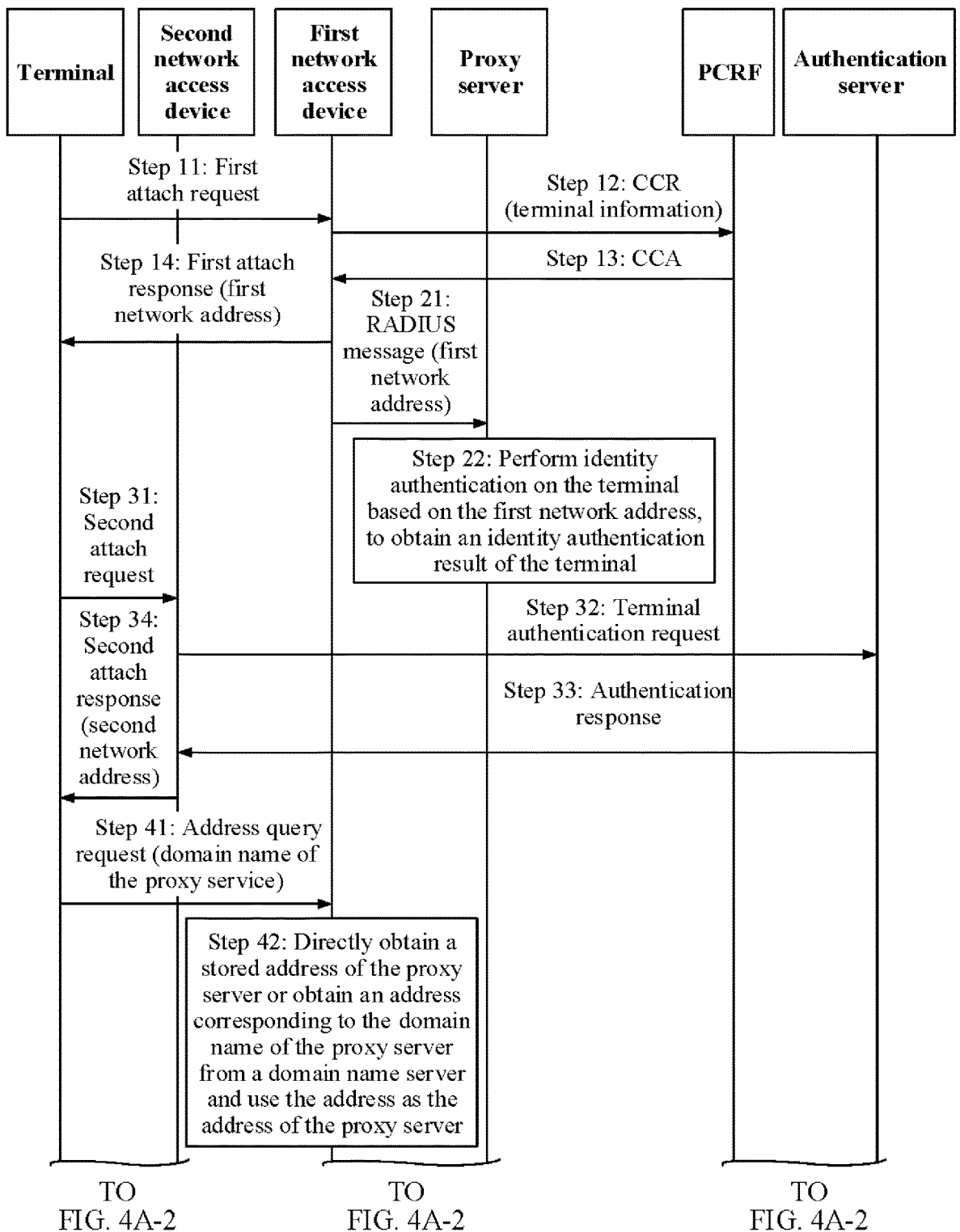
FIGS. 4A-1 and FIG. 4A-2 are a flowchart of a path establishment operation according to an embodiment of this application.
Figures 2, 4A:
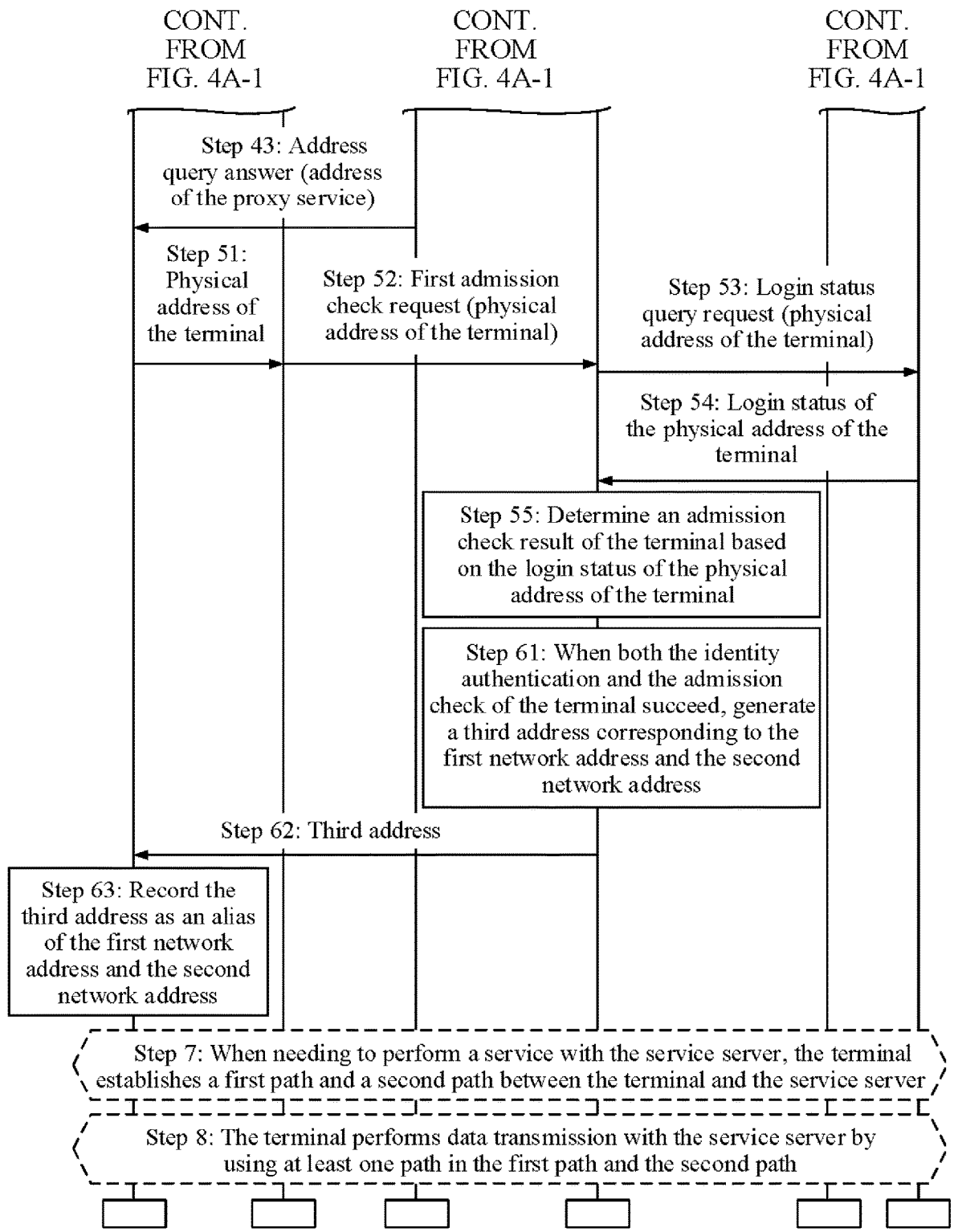

Referring to FIGS. 4A-1 and FIG. 4A-2, the path establishment operation may include step 1 to step 8 below.

Step 1 (including step 11 to step 14): A terminal accesses a first network via a first network access device, that is, the terminal attaches to the first network.

A process in which the terminal attaches to the first network may be implemented by using a policy and charging control (PCC) procedure. Specifically, in step 11, the terminal sends a first attach request to the first network access device. In step 12, after receiving the first attach request, the first network access device sends a credit control request (CCR) carrying terminal information to a PCRF. In step 13, after receiving the CCR, the PCRF performs access authentication on the terminal based on the terminal information; and after the access authentication succeeds, the PCRF returns a credit control answer (CCA) to the first network access device. In step 14, when receiving the CCA, the first network access device allocates a first network address to the terminal, and sends a first attach response carrying the first network address to the terminal. In this case, the terminal accesses the first network.

It should be noted that the terminal information is information related to a terminal identity. For example, the terminal information may include information such as an IMSI and an APN of the terminal. This is not limited in this embodiment of this application.

Step 2 (including step 21 and step 22): A proxy server performs identity authentication on the terminal.

Specifically, in step 21, the first network access device copies a RADIUS message carrying the first network address to the proxy server. In step 22, when receiving the RADIUS message, the proxy server performs identity authentication on the terminal based on the first network address, to obtain an identity authentication result of the terminal.

Step 3 (including step 31 to step 34): The terminal accesses the second network via the second network access device, that is, the terminal attaches to the second network.

Specifically, in step 31, the terminal sends a second attach request to the second network access device. In step 32, after receiving the second attach request, the second network access device sends a terminal authentication request to an authentication server. In step 33, when receiving the terminal authentication request, the authentication server performs access authentication on the terminal, and returns an authentication response to the second network access device after the access authentication succeeds. In step 34, when receiving the authentication response, the second network access device allocates a second network address to the terminal, and sends a second attach response carrying the second network address to the terminal. In this case, the terminal accesses the second network.

Step 4 (including step 41 to step 43): The terminal obtains an address of the proxy server.

Specifically, in step 41, the terminal sends an address query request carrying a domain name of the proxy server to the first network access device. In step 42, when receiving the address query request, the first network access device directly obtains a stored address of the proxy server, or obtains, from a domain name server, an address corresponding to the domain name of the proxy server as the address of the proxy server. In step 43, the first network access device sends an address query answer carrying the address of the proxy server to the terminal.

Step 5 (including step 51 to step 55): The proxy server performs an admission check on the terminal.

Specifically, the terminal reports a physical address of the terminal to the proxy server based on the address of the proxy server. To be specific, in step 51, the terminal sends the physical address of the terminal to the second network access device based on the address of the proxy server. Then, in step 52, the second network access device sends a first admission check request carrying the physical address of the terminal to the proxy server. In step 53, when receiving the physical address of the terminal, the proxy server sends a login status query request carrying the physical address of the terminal to the authentication server. In step 54, when receiving the login status query request, the authentication server queries the login status of the physical address of the terminal, and sends the login status of the physical address of the terminal to the proxy server. In step 55, when receiving the login status of the physical address of the terminal, the proxy server determines an admission check result of the terminal based on the login status of the physical address of the terminal.

Step 6 (including step 61 to step 63): The proxy server allocates a third address to the terminal when both the identity authentication and the admission check of the terminal succeed.

Specifically, in step 61, after both the identity authentication and the admission check of the terminal succeed, the proxy server generates the third address corresponding to the first network address and the second network address. In step 62, the proxy server sends the third address to the terminal. In step 63, when receiving the third address, the terminal records the third address as an alias of the first network address and the second network address.

Step 7: When needing to perform a service with the service server, the terminal establishes a first path and a second path between the terminal and the service server.

Step 8: The terminal performs data transmission with the service server by using the first path and the second path.

Path Delete Operation

Figure 4B:
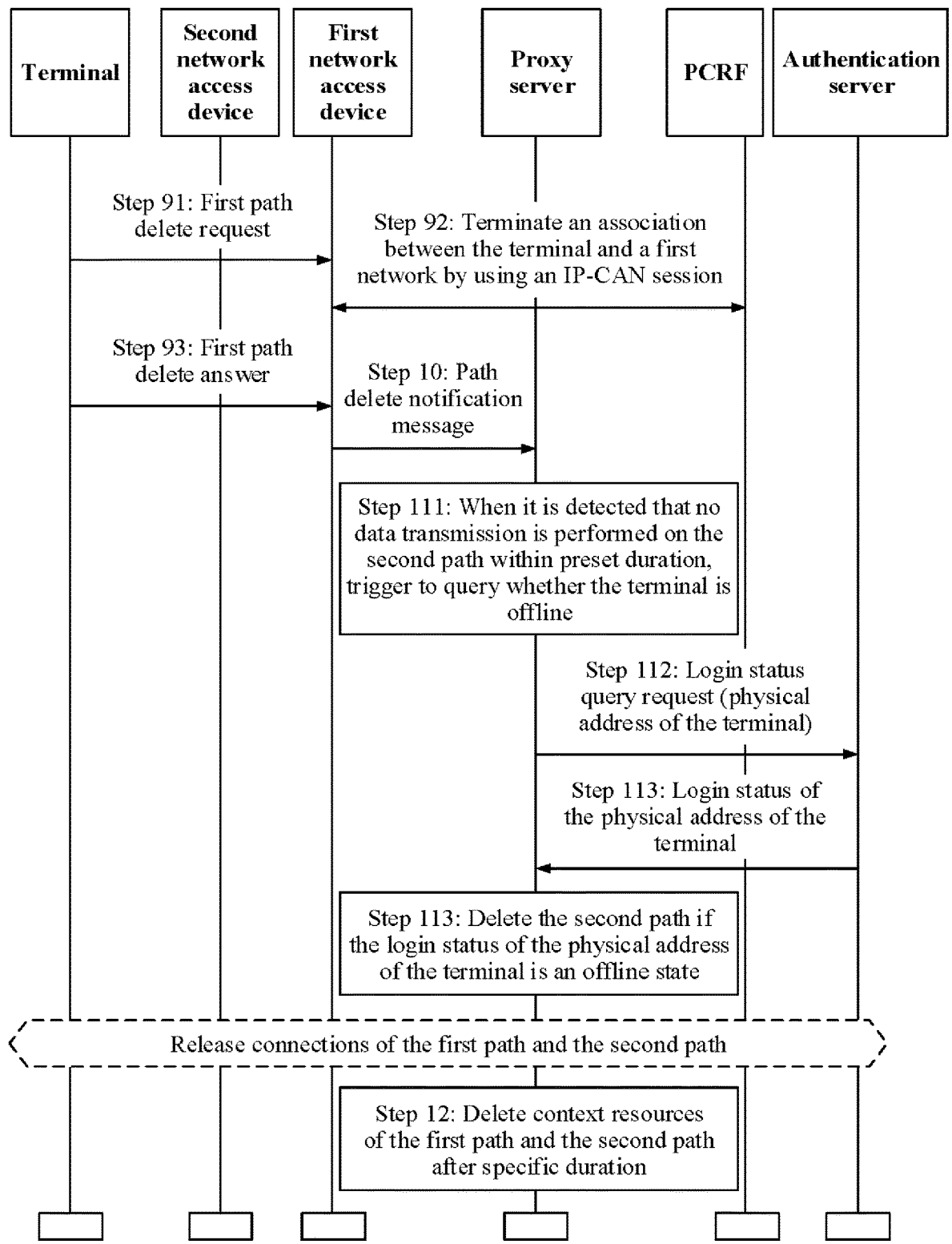
FIG. 4B is a flowchart of a path delete operation according to an embodiment of this application.

It should be noted that, after step 7, the first path and the second path may alternatively be deleted. Referring to FIG. 4B, the path delete operation may include step 9 to step 12 below.

Step 9 (including step 91 to Step 93): The first network access device deletes the first path.

Specifically, in step 91, the terminal sends a first path delete request to the first network access device. In step 92, when the first network access device receives the first path delete request, an IP connectivity access network (IP-CAN) session is used between the first network access device and the PCRF to terminate an association between the terminal and the first network. In step 93, the first network access device sends a first path delete answer to the terminal.

Step 10: The first network access device sends a path delete notification message to the proxy server.

It should be noted that the path delete notification message may be a RADIUS message, and the path delete notification message may carry the terminal information, the first network address, an address of the first network access device, a cause value, and the like.

Step 11 (including step 111 to step 113): The proxy server deletes the second path.

Specifically, in step 111, when detecting that no data is transmitted on the second path within preset duration, the proxy server triggers to query whether the terminal is offline. In step 112, the proxy server sends the login status query request carrying the physical address of the terminal to the authentication server. In step 113, when receiving the login status query request, the authentication server queries the login status of the physical address of the terminal, and sends the login status of the physical address of the terminal to the proxy server. In step 114, when the proxy server receives the login status of the physical address of the terminal, if the login status of the physical address of the terminal is an offline state, the proxy server deletes the second path.

Step 12: The proxy server deletes context resources of the first path and the second path after a specific duration.

Service Policy Obtaining Operation of the Terminal

Figure 4C:
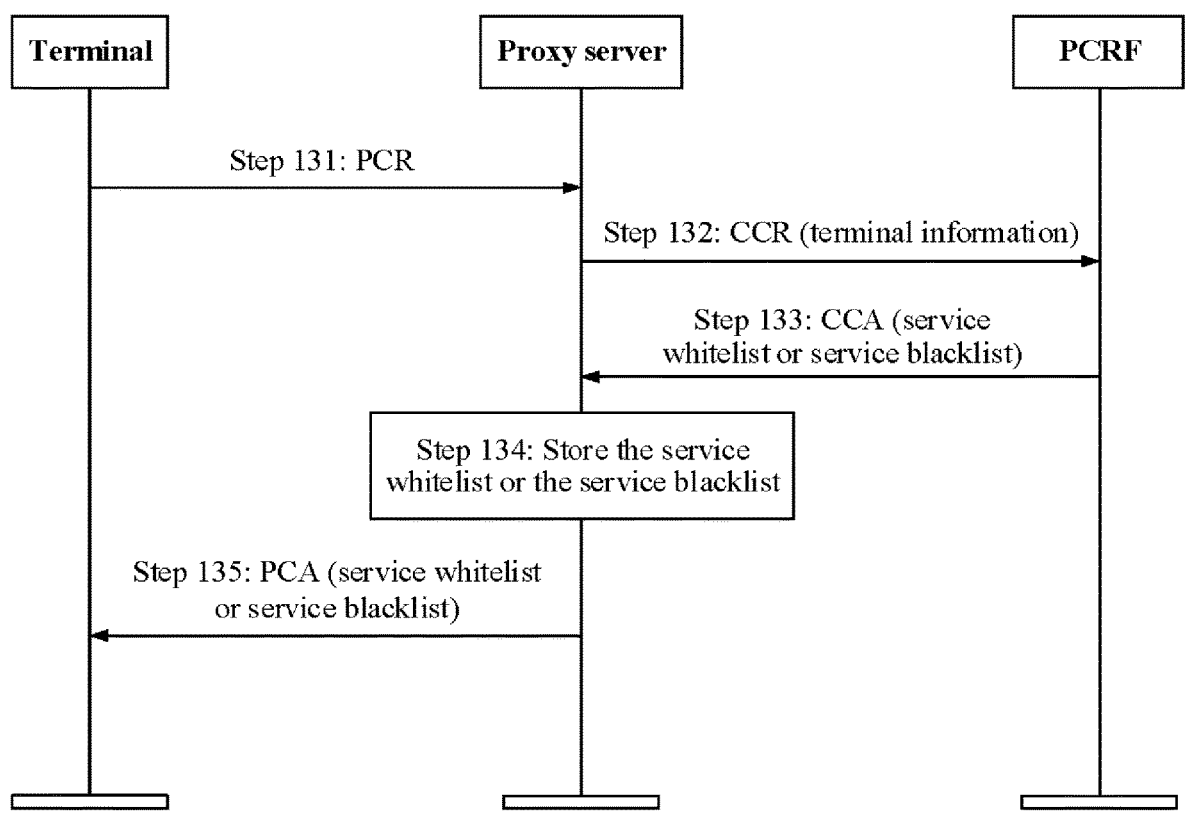
FIG. 4C is a flowchart of obtaining a service policy operation by a terminal according to an embodiment of this application.

It should be noted that in step 7 above, when establishing the first path and the second path between the terminal and the service server, the terminal may establish the first path and the second path to the service server based on a preset service policy. In this case, the terminal needs to obtain the service policy in advance. The service policy obtaining operation of the terminal may be performed after the terminal already accesses the first network and the second network, that is, may be performed after step 1 and step 3, and may be performed before the first path and the second path are established between the terminal and the service server, that is, may be performed before step 7. Referring to FIG. 4C, the service policy obtaining operation of the terminal may include step 131 to step 134 below.

Step 131: The terminal sends a PCR to the proxy server.

It should be noted that, to reduce a quantity of times of interaction, during actual application, the terminal may alternatively send the PCR carrying the physical address of the terminal used for the access check of the terminal in step 5 above to the proxy server. In this case, a process in which the terminal sends the PCR to the proxy server is a process in which the terminal sends the PCR to the second network access device, and then the second network access device sends the PCR to the proxy server. In this case, the PCR is the first admission check request in step 5.

Step 132: When the proxy server receives the PCR, the proxy server sends, if a service whitelist and a service blacklist are not stored, a CCR carrying the terminal information to the PCRF.

Step 133: When receiving the CCR, the PCRF sends a CCA carrying a service whitelist or a service blacklist corresponding to the terminal information to the proxy server.

Step 134: When receiving the CCA, the proxy server stores the service whitelist or the service blacklist, and sends a policy control answer (PCA) carrying the service whitelist or the service blacklist to the terminal.

It should be noted that, when the PCR further carries the physical address of the terminal, after receiving the PCR, the proxy server may interact not only with the PCRF to obtain the service whitelist and the service blacklist, but also with the authentication server to obtain the login status of the physical address of the terminal, and determine the admission check result of the terminal accordingly.

In this case, when the admission check of the terminal succeeds, the PCA returned by the proxy server to the terminal may carry not only the service whitelist or the service blacklist, but also information such as the third address and the receive port number that are used to support subsequent multipath establishment of the terminal.

Service Policy Update Operation

Figure 4D:
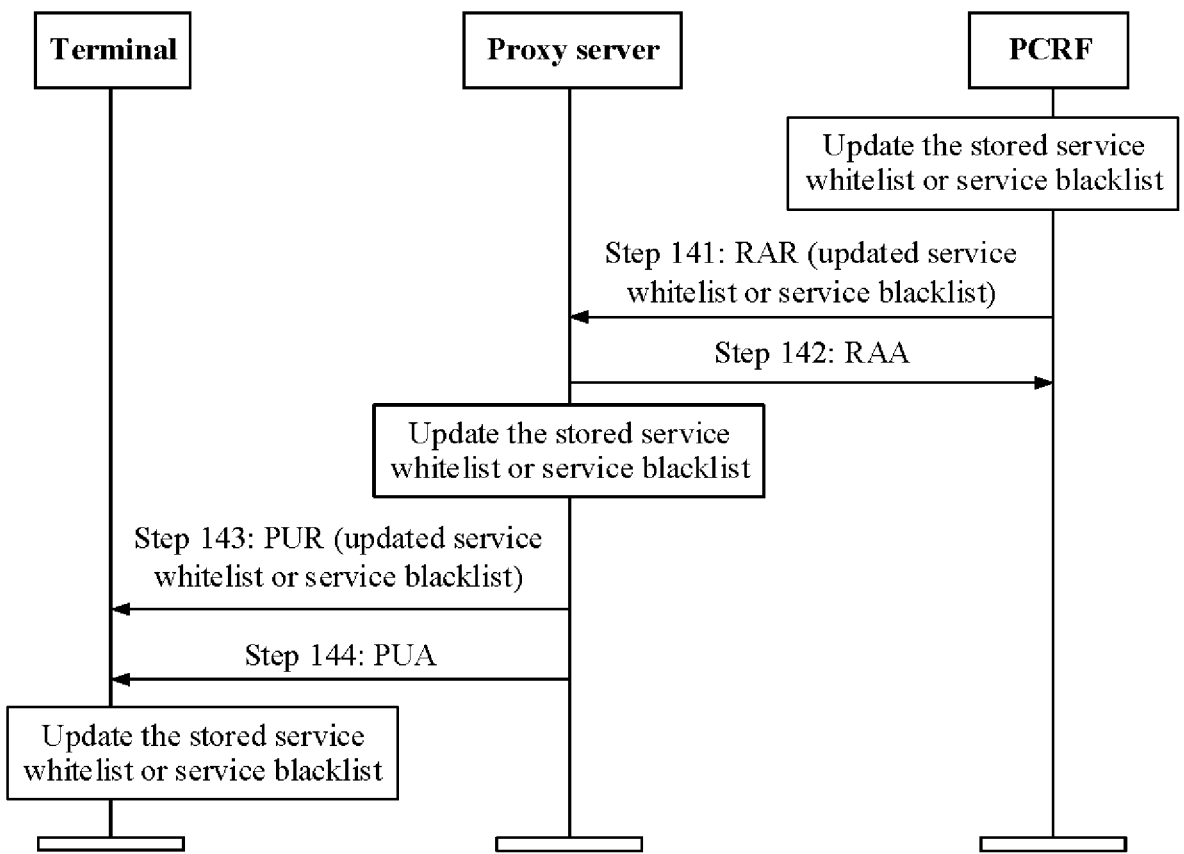
FIG. 4D is a flowchart of a service policy update operation according to an embodiment of this application.

It should be noted that a device for generating a service policy may further update the service policy, and send the updated service policy to a device that has a requirement on using the service policy. Referring to FIG. 4D, the service policy update operation may include step 141 to step 144 below.

Step 141: The PCRF updates the stored service whitelist or service blacklist, and sends, after the update is completed, a re-authentication request (Re-Auth-Request, RAR) carrying the updated service whitelist or service blacklist to the proxy server.

Step 142: When receiving the RAR, the proxy server returns a re-authentication answer (RAA) to the PCRF, and updates the stored service whitelist or service blacklist.

Step 143: The proxy server sends a policy update request (PUR) carrying the updated service whitelist or service blacklist to the terminal.

Step 144: When receiving the PUR, the terminal returns a policy update answer (PUA) to the proxy server, and updates the stored service whitelist or service blacklist.

Service Policy Control Operation

Figure 4E:
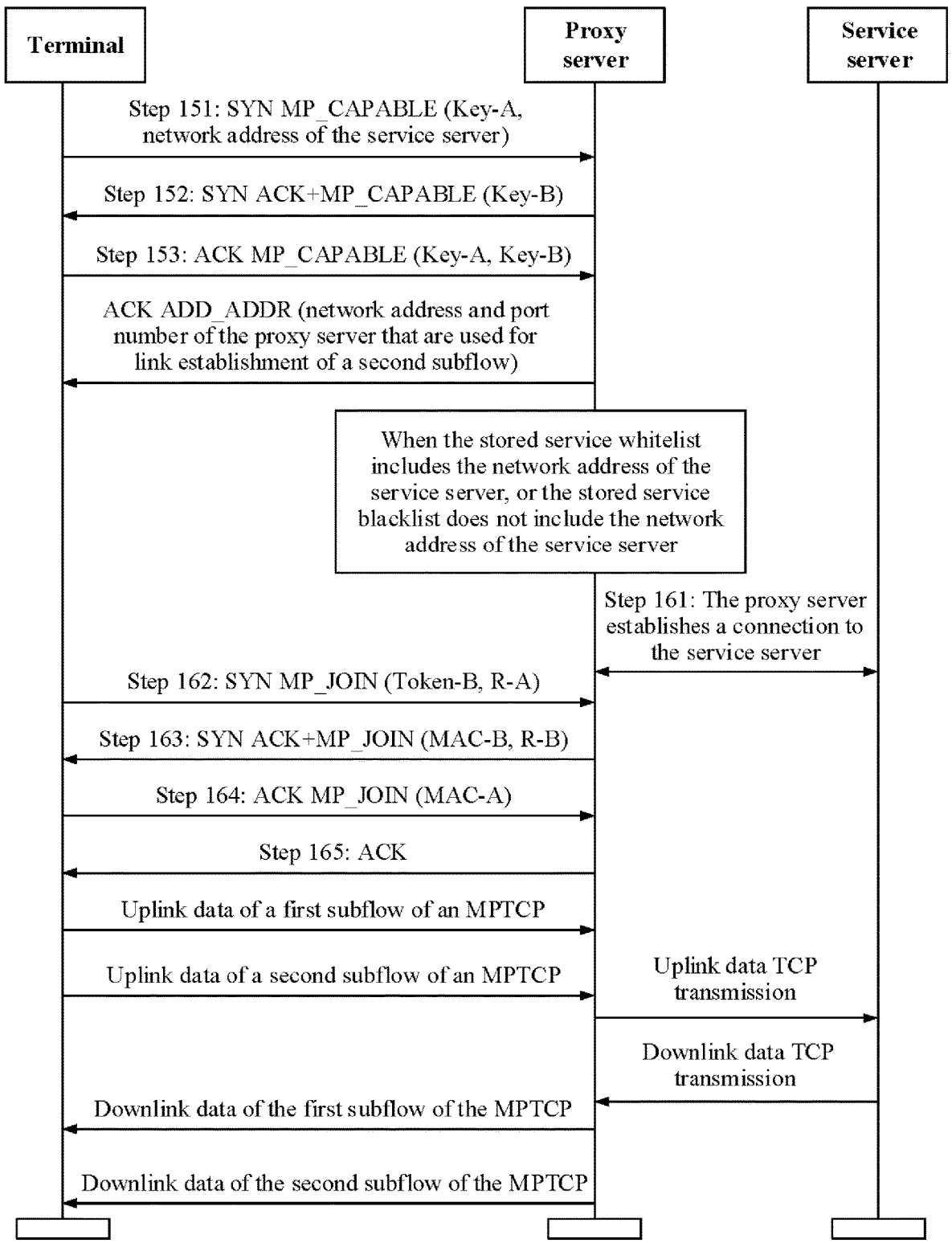
FIG. 4E is a flowchart of a service policy control operation according to an embodiment of this application.
Figure 4F:
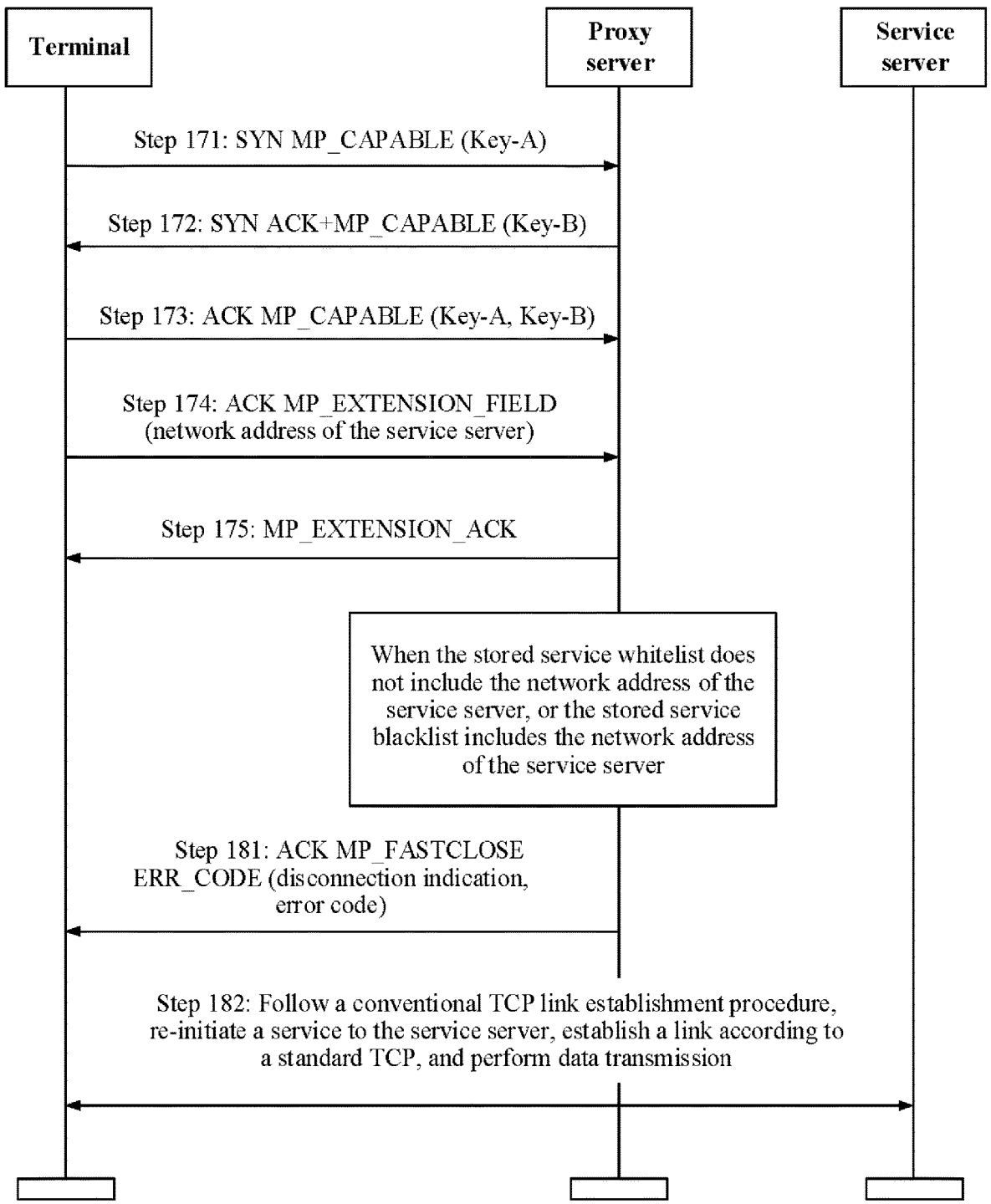
FIG. 4F is a flowchart of another service policy control operation according to an embodiment of this application.

It should be noted that, when step 7 above is implemented, the terminal or the proxy server may establish the first path and the second path between the terminal and the service server based on a preset service policy. Herein, that the proxy server establishes the first path and the second path between the terminal and the service server based on the preset service policy is used as an example for description. In this case, the service policy control operation may include the following two cases. Referring to FIG. 4E, a first case includes step 15 and step 16 below. Referring to FIG. 4F, a second case includes step 17 and step 18 below.

Case 1:

Step 15 (including step 151 to step 154): In a process of establishing a first subflow to the proxy server, the terminal sends the network address of the service server to the proxy server, and establishes the first subflow to the proxy server.

Specifically, in step 151, the terminal sends a SYN MP_CAPABLE message carrying a connection key (Key-A) of the terminal and the network address of the service server to the proxy server. In step 152, when receiving the SYN MP_CAPABLE message, the proxy server returns a SYN ACK MP_CAPABLE message carrying a connection key (Key-B) of the proxy server to the terminal. In step 153, when receiving the SYN ACK MP_CAPABLE message, the terminal sends an ACK MP_CAPABLE message carrying the connection key (Key-A) of the terminal and the connection key (Key-B) of the proxy server to the proxy server, to establish the first subflow to the proxy server.

Further, when receiving the ACK MP_CAPABLE message, the proxy server may alternatively send, to the terminal, an ACK ADDR_ADDR message carrying a network address and a port number of a proxy server that are used for link establishment of a second subflow, so that the terminal may subsequently establish the second subflow to the proxy server based on the ACK ADDR_ADDR message.

Step 16 (including step 161 to step 165): When receiving the network address of the service server, the proxy server performs service policy control on path establishment of the terminal.

Specifically, in step 161, if the stored service whitelist includes the network address of the service server, or if the stored service blacklist does not include the network address of the service server, the proxy server establishes a connection to the service server. In step 162, the terminal sends a SYN MP_JOIN message carrying a token (Token-B) of the proxy server and a terminal number (R-A) to the proxy server. In step 163, when receiving the SYN MP_JOIN message, the proxy server returns a SYN ACK MP_JOIN message carrying the physical address (MAC-B) of the proxy server and a proxy server number (R-B) to the terminal. In step 164, when receiving the SYN ACK MP_JOIN message, the terminal returns an ACK MP_JOIN message carrying the physical address (MAC-A) of the terminal to the proxy server. In step 165, when receiving the ACK MP_JOIN message, the proxy server returns an ACK message to the terminal, to establish a second subflow between the terminal and the proxy server.

Case 2:

Step 17 (including step 171 to step 175): After establishing the first subflow to the proxy server, the terminal sends the network address of the service server to the proxy server.

Specifically, in step 171, the terminal sends a SYN MP_CAPABLE message carrying the connection key (Key-A) of the terminal to the proxy server. In step 172, when receiving the SYN MP_CAPABLE message, the proxy server returns a SYN ACK MP_CAPABLE message carrying a connection key (Key-B) of the proxy server to the terminal. In step 173, when receiving the SYN ACK MP_CAPABLE message, the terminal sends an ACK MP_CAPABLE message carrying the connection key (Key-A) of the terminal and the connection key (Key-B) of the proxy server to the proxy server, to establish the first subflow between the terminal and the proxy server. In step 174, the terminal sends an ACK MP_EXTENSION_FIELD message carrying the network address of the service server to the proxy server. In step 175, when receiving the ACK MP_EXTENSION_FIELD message, the proxy server sends an MP_EXTENSION_ACK message to the terminal.

Step 18 (including step 181 and step 182): When receiving the network address of the service server, the proxy server performs service policy control on path establishment of the terminal.

Specifically, in step 181, if the stored service whitelist does not include the network address of the service server, or if the stored service blacklist includes the network address of the service server, the proxy server sends an ACK MP_FASTCLOSE ERR_CODE message carrying a link disconnection indication and an error code to the terminal, to disconnect the first subflow from the terminal, and not to establish a second subflow to the terminal. In step 182, when receiving the ACK MP_FASTCLOSE ERR_CODE message, the terminal follows a conventional TCP link establishment process, re-initiates a service to the service server, establishes a link based on standard TCP, and performs data transmission.

It should be noted that the ACK MP_FASTCLOSE ERR_CODE message may be obtained by extending an original MP_FASTCLOSE message in an MPTCP protocol, that is, an error code field is added to the original MP_FASTCLOSE message to obtain the ACK MP_FASTCLOSE ERR_CODE message. The error code field may include a plurality of types of data, and each type of data represents a different error cause. For example, the error code field may include six types of data, namely, data of A to F. An error code being valid when A is set to 1 indicates a default exception cause. An error code being valid when B is set to 1 indicates that the service server fails to be accessed. An error code being valid when C is set to 1 indicates that data transmission is interrupted in the service server. An error code being valid when D is set to 1 indicates that the network address of the service server belongs to the service blacklist or does not belong to the service whitelist, and MPTCP access is rejected. An error code being valid when E is set to 1 indicates that only a single Wi-Fi link is available, the Wi-Fi is untrusted, and MPTCP access is rejected. An error code being valid when F is set to 1 indicates that link establishment negotiation fails and MPTCP access is rejected.

In this embodiment of this application, the foregoing six operations can resolve a user authentication problem and a service policy problem of multi-stream hybrid access of the terminal in a process in which the terminal performs multipath access, to ensure security of the first path and the second path that are established between the terminal and the service server. Therefore, security of subsequent data transmission performed between the terminal and the service server by using the first path and the second path can be ensured.

Figure 5A:
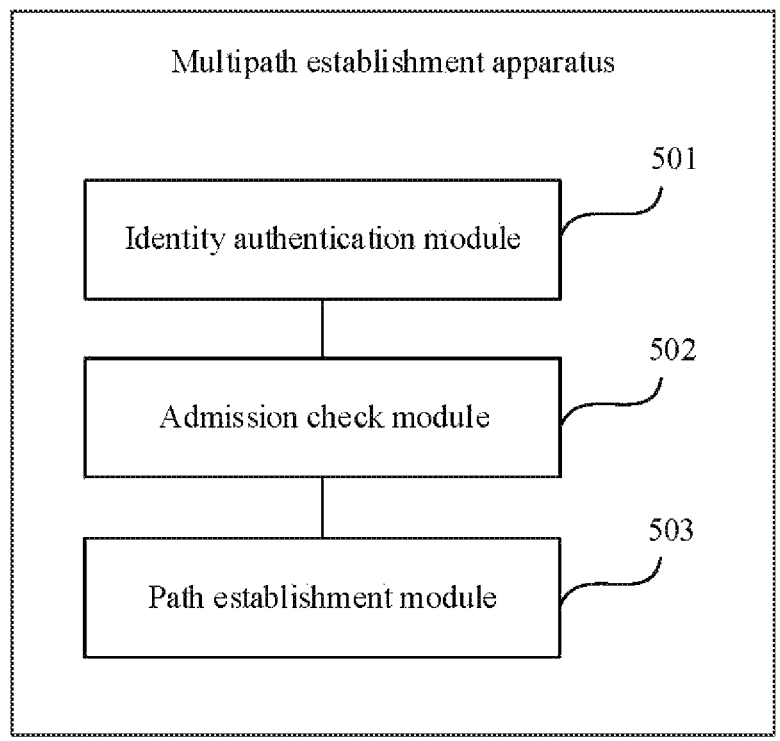
FIG. 5A is a schematic structural diagram of a multipath establishment apparatus according to an embodiment of this application.

FIG. 5A is a schematic structural diagram of a multipath establishment apparatus according to an embodiment of this application. The multipath establishment apparatus may be implemented as a part of a computer device or an entire computer device by using software, hardware, or a combination thereof. The computer device may be the computer device shown in FIG. 2A. Referring to FIG. 5A, the apparatus includes an identity authentication module 501, an admission check module 502, and a path establishment module 503.

The identity authentication module 501 is configured to perform step 301 in the embodiment in FIG. 3.

The admission check module 502 is configured to perform step 302 in the embodiment in FIG. 3.

The path establishment module 503 is configured to perform step 303 in the embodiment in FIG. 3.

Figure 5B:
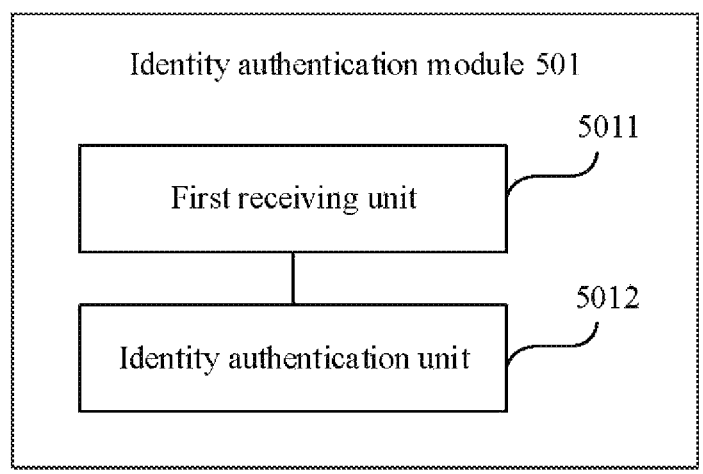
FIG. 5B is a schematic structural diagram of an identity authentication module according to an embodiment of this application.

Optionally, referring to FIG. 5B, the identity authentication module 501 includes:

a first receiving unit 5011, configured to receive an identity authentication request that carries a first network address and that is sent by a first network access device, where the first network address is a network address allocated by the first network access device to a terminal; and an identity authentication unit 5012, configured to perform identity authentication on the terminal based on the first network address, to obtain an identity authentication result of the terminal.

Figure 5C:
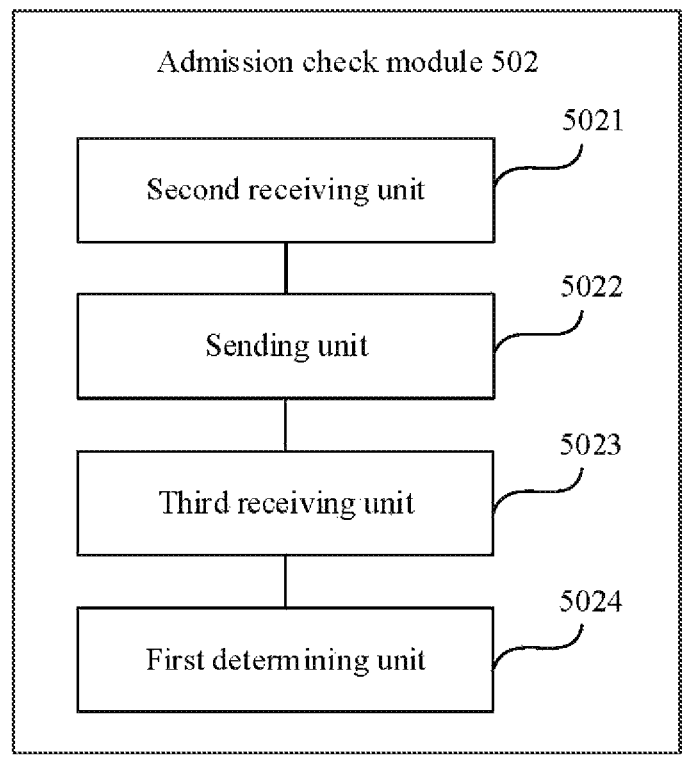
FIG. 5C is a schematic structural diagram of an admission check module according to an embodiment of this application.

Optionally, referring to FIG. 5C, the admission check module 502 includes:

a second receiving unit 5021, configured to receive a first admission check request that carries a physical address of the terminal and that is sent by a second network access device;

a sending unit 5022, configured to send a login status query request carrying the physical address to an authentication server, so that the authentication server queries a login status of the physical address;

a third receiving unit 5023, configured to receive the login status that is of the physical address and that is sent by the authentication server; and a first determining unit 5024, configured to determine an admission check result of the terminal based on the login status of the physical address.

Figure 5D:
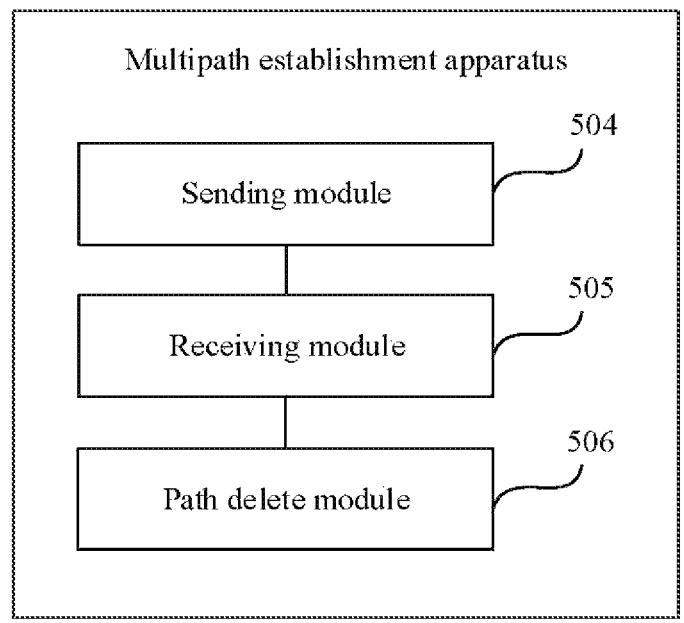
FIG. 5D is a schematic structural diagram of another multipath establishment apparatus according to an embodiment of this application.

Optionally, referring to FIG. 5D, the apparatus further includes:

a sending module 504, configured to send, if it is detected that no data is transmitted on a second path within preset duration, the login status query request carrying the physical address to the authentication server, so that the authentication server queries the login status of the physical address;

a receiving module 505, configured to receive the login status that is of the physical address and that is sent by the authentication server; and a path delete module 506, configured to delete the second path if the login status of the physical address is an offline state.

Figure 5E:
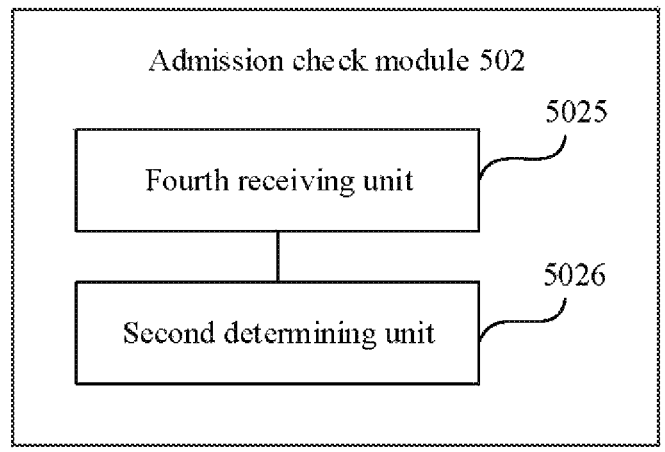
FIG. 5E is a schematic structural diagram of another admission check module according to an embodiment of this application.

Optionally, referring to FIG. 5E, the admission check module 502 includes:

a fourth receiving unit 5025, configured to receive a second admission check request that carries a second network address and that is sent by the second network access device, where the second network address is a network address allocated by the second network access device to the terminal; and a second determining unit 5026, configured to determine an admission check result of the terminal based on the second network address and a preset admission address range.

Figure 5F:
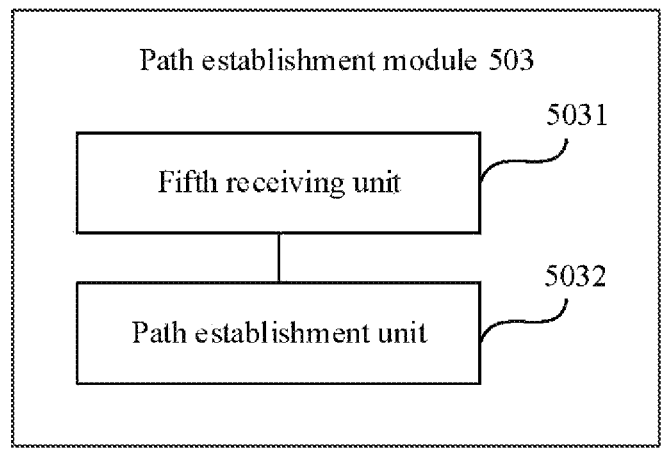
FIG. 5F is a schematic structural diagram of a path establishment module according to an embodiment of this application.

Optionally, referring to FIG. 5F, the path establishment module 503 includes:

a fifth receiving unit 5031, configured to receive a network address of the service server that is sent by the terminal; and a path establishment unit 5032, configured to: if a stored service whitelist includes the network address of the service server, or if a stored service blacklist does not include the network address of the service server, establish a first path between the terminal and the service server via a first network, and establish the second path between the terminal and the service server via a second network.

Optionally, the first network is an LTE network, and the second network is a DSL network or a Wi-Fi network.

In this embodiment of this application, after the terminal accesses the first network via the first network access device, the proxy device performs identity authentication on the terminal; after the terminal accesses the second network via the second network access device, the proxy device performs an admission check on the terminal; and after both the identity authentication and the admission check of the terminal succeed, it indicates that multipath access of the terminal is valid. Therefore, the proxy server establishes the first path between the terminal and the service server via the first network, and establishes the second path between the terminal and the service server via the second network. In this case, the established first path and second path have relatively high security. Therefore, security of subsequent data transmission of the terminal can be ensured.

Figure 6:
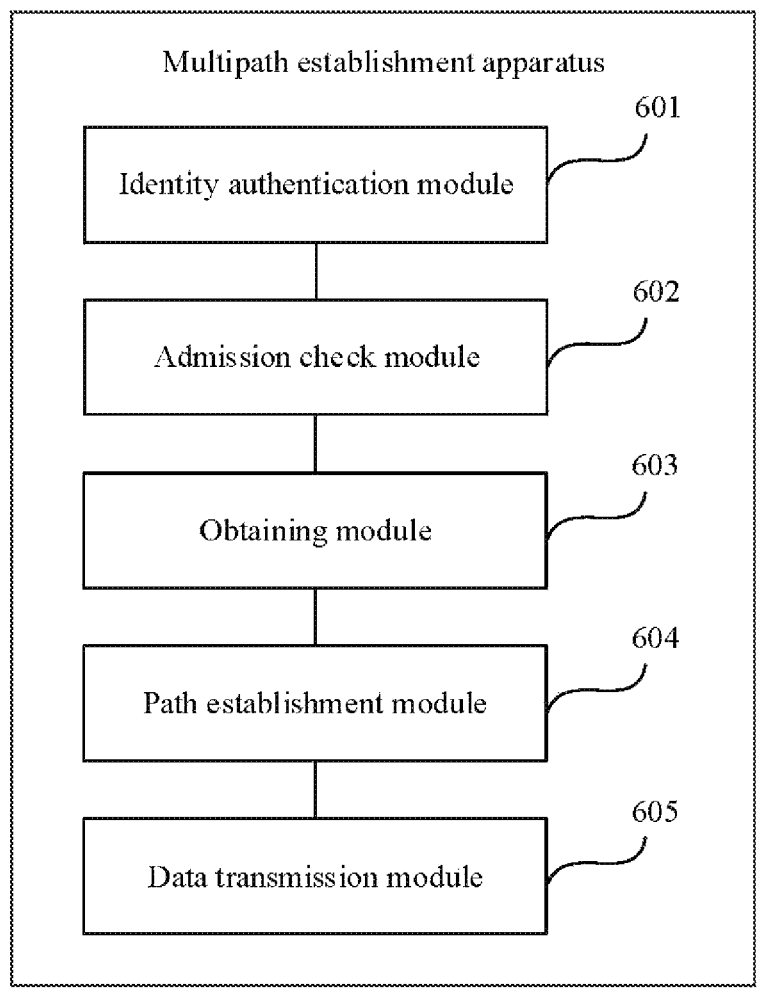
FIG. 6 is a schematic structural diagram of another multipath establishment apparatus according to an embodiment of this application.

FIG. 6 is a schematic structural diagram of a multipath establishment apparatus according to an embodiment of this application. The multipath establishment apparatus may be implemented as a part of a computer device or an entire computer device by using software, hardware, or a combination thereof. The computer device may be the computer device shown in FIG. 2B. Referring to FIG. 6, the apparatus includes an identity authentication module 601, an admission check module 602, an obtaining module 603, a path establishment module 604, and a data transmission module 605.

The identity authentication module 601 is configured to: after a first network is accessed via a first network access device, perform identity authentication by using a proxy device, where the first network implements communication by using a base station.

The admission check module 602 is configured to: after a second network is accessed via a second network access device, perform an admission check by using the proxy device.

The obtaining module 603 is configured to: after both the identity authentication and the admission check succeed, obtain a network address of a service server.

The path establishment module 604 is configured to: if a stored service whitelist includes the network address of the service server, or if a stored service blacklist does not include the network address of the service server, establish a first path to the service server via the first network, and establish a second path to the service server via the second network, where the service whitelist or the service blacklist is obtained from the proxy device.

The data transmission module 605 is configured to perform data transmission with the service server by using the first path and the second path.

In this embodiment of this application, after accessing the first network via the first network access device, the terminal performs identity authentication by using the proxy device. After accessing the second network via the second network access device, the terminal performs an admission check by using the proxy device. After both the identity authentication and the admission check of the terminal succeed, it indicates that multipath access of the terminal is valid. In this case, the terminal may obtain the network address of the service server. When the service whitelist includes the network address of the service server, or when the service blacklist does not include the network address of the service server, the terminal establishes the first path to the service server via the first network, and establishes the second path to the service server via the second network. In this case, the established first path and second path not only have relatively high security, but also meet a service access requirement. Then, the terminal performs data transmission with the service server by using the first path and the second path. Therefore, security of data transmission of the terminal can be effectively ensured.

It should be noted that when multipath establishment is performed by the multipath establishment apparatus provided in the foregoing embodiments, only division of the foregoing function modules is used as an example for description. During actual application, the foregoing functions can be allocated to different function modules and implemented based on a requirement. To be specific, an internal structure of the apparatus is divided into different function modules to implement all or some of the functions described above. In addition, the multipath establishment apparatus provided in the foregoing embodiments and the multipath establishment method embodiments belong to a same concept. For a specific implementation process of the apparatus, refer to the method embodiments. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The foregoing descriptions are embodiments of this application, but are not intended to limit this application. Any modification, equivalent replacement, improvement, or the like made without departing from the principle of this application should fall within the protection scope of this application.

What is claimed is:

1. A method, applied to a proxy device, wherein the method comprises:
    performing identity authentication on a terminal that accesses a first network via a first network access device, wherein the first network implements communication by using a base station;
    performing an admission check on the terminal that accesses a second network via a second network access device; and
    after both the identity authentication and the admission check of the terminal succeed, establishing a first path between the terminal and a service server via the first network, and establishing a second path between the terminal and the service server via the second network, wherein the first path and the second path are used to perform data transmission between the terminal and the service server.

2. The method according to claim 1, wherein the performing identity authentication on the terminal that accesses the first network via the first network access device comprises:
    receiving an identity authentication request that carries a first network address and that is sent by the first network access device, wherein the first network address is allocated by the first network access device to the terminal; and
    performing identity authentication on the terminal based on the first network address, to obtain an identity authentication result of the terminal.

3. The method according to claim 1, wherein the performing the admission check on the terminal that accesses the second network via the second network access device comprises:
    receiving a first admission check request that carries a physical address of the terminal and that is sent by the second network access device;
    sending a login status query request carrying the physical address to an authentication server, so that the authentication server queries a login status of the physical address;
    receiving the login status that is of the physical address and that is sent by the authentication server; and
    determining an admission check result of the terminal based on the login status of the physical address.

4. The method according to claim 3, wherein after the establishing the first path between the terminal and the service server via the first network, and establishing the second path between the terminal and the service server via the second network, the method further comprises:

if detected that no data is transmitted on the second path within a preset duration, sending the login status query request carrying the physical address to the authentication server, so that the authentication server queries the login status of the physical address;

receiving the login status that is of the physical address and that is sent by the authentication server; and deleting the second path if the login status of the physical address is an offline state.

5. The method according to claim 1, wherein the performing the admission check on the terminal that accesses the second network via the second network access device comprises:

receiving a second admission check request that carries a second network address and that is sent by the second network access device, wherein the second network address is a network address allocated by the second network access device to the terminal; and determining an admission check result of the terminal based on the second network address and a preset admission address range.

6. The method according to claim 1, wherein the establishing the first path between the terminal and the service server via the first network, and establishing the second path between the terminal and the service server via the second network comprises:

receiving a network address of the service server that is sent by the terminal;

determining a stored service whitelist comprises the network address of the service server; and establishing the first path between the terminal and the service server via the first network, and establishing the second path between the terminal and the service server via the second network.

7. The method according to claim 1, wherein the establishing the first path between the terminal and the service server via the first network, and establishing the second path between the terminal and the service server via the second network comprises:

receiving a network address of the service server that is sent by the terminal; and determining a stored service blacklist does not comprise the network address of the service server; and establishing the first path between the terminal and the service server via the first network, and establishing the second path between the terminal and the service server via the second network.

8. The method according to claim 1, wherein the first network is a long term evolution (LTE) network, and the second network is a digital subscriber line DSL network or a wireless fidelity (Wi-Fi) network.

9. The method according to claim 1, wherein:

the performing identity authentication on the terminal that accesses the first network via the first network access device comprises:

receiving an identity authentication request that carries a first network address and that is sent by the first network access device, wherein the first network address is allocated by the first network access device to the terminal; and performing identity authentication on the terminal based on the t network address, to obtain an identity authentication result of the terminal;

wherein the performing the admission check on the terminal that accesses the second network via the second network access device comprises:

receiving a second admission check request that carries a second network address and that is sent by the second network access device, wherein the second network address is a network address allocated by the second network access device to the terminal; and determining an admission check result of the terminal based on the second network address and a preset admission address range;

the method further comprising:

generating a third address corresponding to the first network address and the second network address after both the identity authentication and the admission check succeed; and recording, in the terminal, the third address as an alias of the first network address and the second network address.

10. The method according to claim 1, further comprising:

deleting, by the first network access device, the first path;

sending, by the terminal device, a first path delete request to the first network device;

sending, by the first network access device, a path deletion notification to the proxy device;

deleting, by the proxy device the second path.

11. A method, applied to a terminal, wherein the method comprises:

after a first network is accessed via a first network access device, performing identity authentication by using a proxy device, wherein the first network implements communication by using a base station;

after a second network is accessed via a second network access device, performing an admission check by using the proxy device;

after both the identity authentication and the admission check succeed;

establishing a first path to a service server via the first network, and establishing a second path to the service server via the second network, wherein a service whitelist or a service blacklist is obtained from the proxy device; and performing data transmission with the service server by using the first path and the second path.

12. A multipath establishment apparatus, comprising:

a processor;

a memory storing a program and coupled with the processor, the processor is configured to execute the program stored in the memory and the multipath establishment apparatus is caused to:

perform identity authentication on a terminal that accesses a first network via a first network access device, wherein the first network implements communication by using a base station;

perform an admission check on the terminal that accesses a second network via a second network access device; and after both the identity authentication and the admission check of the terminal succeed, establish a first path between the terminal and a service server via the first network, and establish a second path between the terminal and the service server via the second network, wherein the first path and the second path are used to perform data transmission between the terminal and the service server.

13. The apparatus according to claim 12, wherein the performing identity authentication on the terminal that accesses the first network via the first network access device comprises:

receiving an identity authentication request that carries a first network address and that is sent by the first network access device, wherein the first network address is a network address allocated by the first network access device to the terminal; and performing identity authentication on the terminal based on the first network address, to obtain an identity authentication result of the terminal.

14. The apparatus according to claim 12, wherein the performing the admission check on the terminal that accesses the second network via the second network access device comprises:

receiving a first admission check request that carries a physical address of the terminal and that is sent by the second network access device;

sending a login status query request carrying the physical address to an authentication server, so that the authentication server queries a login status of the physical address;

receiving the login status that is of the physical address and that is sent by the authentication server; and determining an admission check result of the terminal based on the login status of the physical address.

15. The apparatus according to claim 14, wherein the apparatus is further caused to:

if detected that no data is transmitted on the second path within a preset duration, send the login status query request carrying the physical address to the authentication server, so that the authentication server queries the login status of the physical address; and receive the login status that is of the physical address and that is sent by the authentication server.

16. The apparatus according to claim 15, wherein the apparatus is further caused to:

delete the second path if the login status of the physical address is an offline state.

17. The apparatus according to claim 12, wherein the apparatus is further caused to:

receive a second admission check request that carries a second network address and that is sent by the second network access device, wherein the second network address is allocated by the second network access device to the terminal; and determine an admission check result of the terminal based on the second network address and a preset admission address range.

18. The apparatus according to claim 12, wherein the apparatus is further caused to:

receive a network address of the service server that is sent by the terminal;

determine a stored service whitelist comprises the network address of the service server; and establish the first path between the terminal and the service server via the first network, and establish the second path between the terminal and the service server via the second network.

19. The apparatus according to claim 12, wherein the processor further causes the apparatus to:

receive a network address of the service server that is sent by the terminal; and determine a stored service blacklist does not comprise the network address of the service server; and establish the first path between the terminal and the service server via the first network, and establish the second path between the terminal and the service server via the second network.

20. The apparatus according to claim 12, wherein the first network is a long term evolution (LTE) network, and the second network is a digital subscriber line (DSL) network or a wireless fidelity (Wi-Fi) network.

* * * * *